(12) United States Patent
Soliman et al.

(10) Patent No.: US 12,556,196 B2
(45) Date of Patent: Feb. 17, 2026

(54) METHOD FOR PROCESSING INPUT VARIABLES BY MEANS OF A PROCESSING DEVICE COMPRISING AT LEAST TWO FIELD-EFFECT TRANSISTORS, DEVICE FOR EXECUTING THE METHOD, COMPUTING DEVICE, AND USE

(71) Applicant: Robert Bosch GmbH, Stuttgart (DE)

(72) Inventors: Taha Soliman, Renningen (DE); Tobias Kirchner, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 211 days.

(21) Appl. No.: 18/419,789

(22) Filed: Jan. 23, 2024

(65) Prior Publication Data

US 2024/0259031 A1 Aug. 1, 2024

(30) Foreign Application Priority Data

Jan. 30, 2023 (DE) ............... 10 2023 200 723.1

(51) Int. Cl.
| | |
|---|---|
| H03M 1/44 | (2006.01) |
| G11C 11/22 | (2006.01) |
| G11C 11/402 | (2006.01) |
| G11C 11/4096 | (2006.01) |
| H03K 5/08 | (2006.01) |
| H03M 1/12 | (2006.01) |
| H03M 1/36 | (2006.01) |
| H03M 1/46 | (2006.01) |

(52) U.S. Cl.
CPC ........... *H03M 1/447* (2013.01); *G11C 11/225* (2013.01); *G11C 11/4023* (2013.01); *G11C 11/4096* (2013.01); *H03K 5/08* (2013.01); *H03M 1/124* (2013.01); *H03M 1/366* (2013.01); *H03M 1/466* (2013.01)

(58) Field of Classification Search
CPC ...... H03M 1/447; H03M 1/366; H03M 1/466; H03M 1/124; H03K 5/08; G11C 11/4023; G11C 11/225; G11C 11/4096
USPC ........................................ 341/136, 155, 161
See application file for complete search history.

(56) References Cited

U.S. PATENT DOCUMENTS

| | | | |
|---|---|---|---|
| 9,548,948 B2 * | 1/2017 | Mora Puchalt | ....... H03M 1/124 |
| 2008/0143385 A1 | 6/2008 | Hanna et al. | |
| 2022/0416657 A1 | 12/2022 | Floriani et al. | |

* cited by examiner

*Primary Examiner* — Khai M Nguyen
(74) *Attorney, Agent, or Firm* — NORTON ROSE FULBRIGHT US LLP

(57) ABSTRACT

A method for processing input variables using a processing device including at least two field-effect transistors. Drain-to-source paths of the at least two field-effect transistors are each connected to a first circuit node. The method includes: applying to a gate electrode of the first field-effect transistor a first drive signal which characterizes a first input variable associated with the first field-effect transistor; applying to a gate electrode of the second field-effect transistor a second drive signal which characterizes a first input variable associated with the second field-effect transistor, wherein at least one of the first drive signal and/or the second drive signal has a non-constant amplitude.

26 Claims, 18 Drawing Sheets

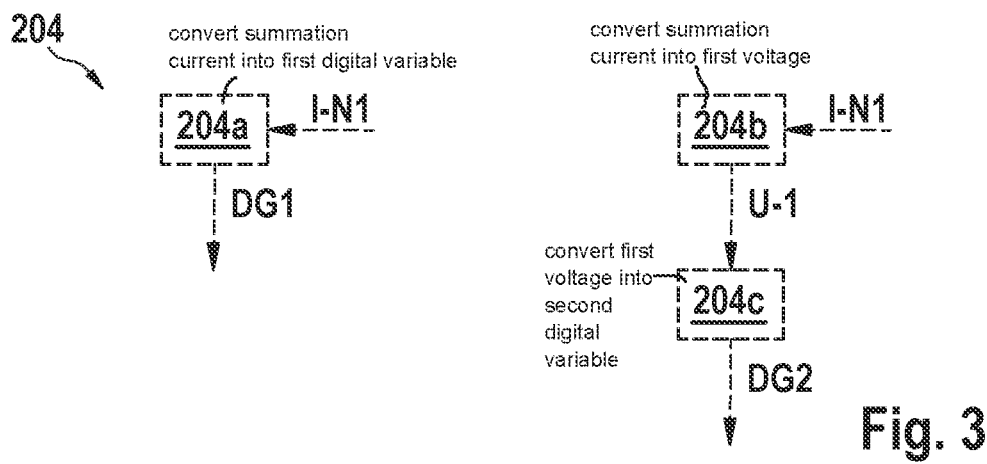
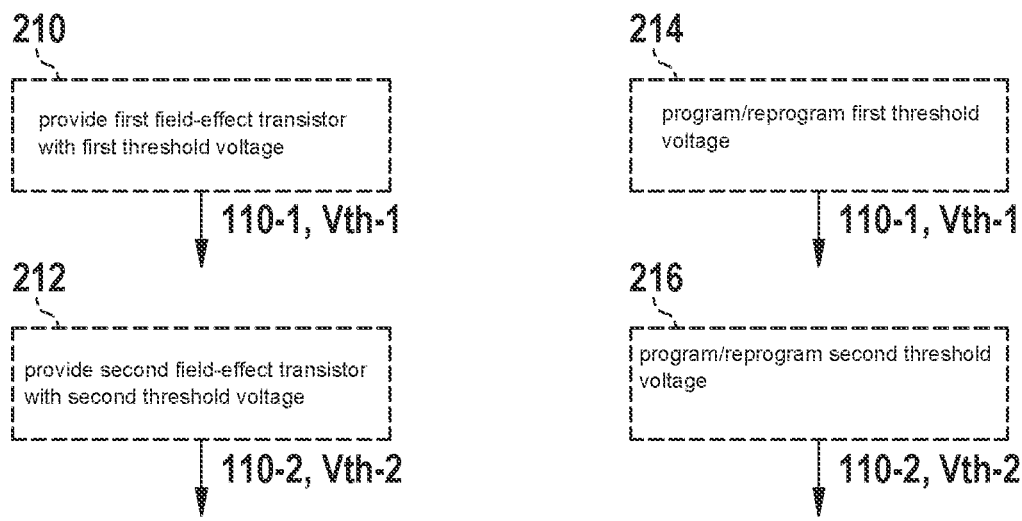
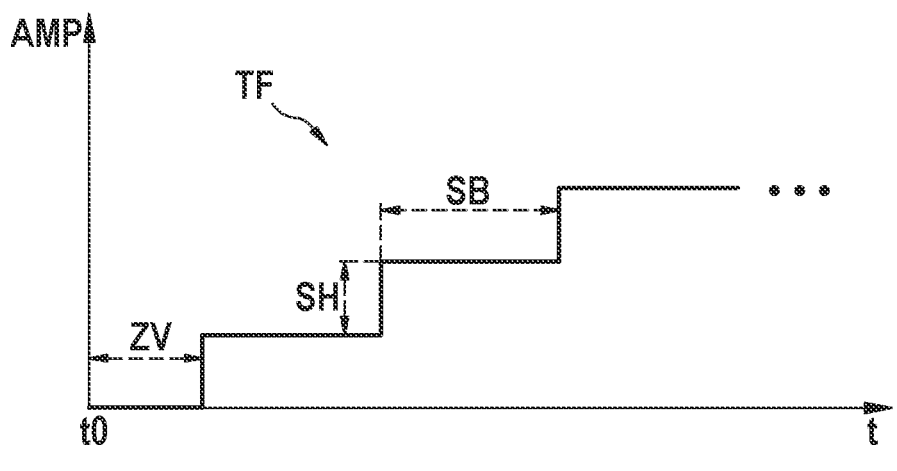

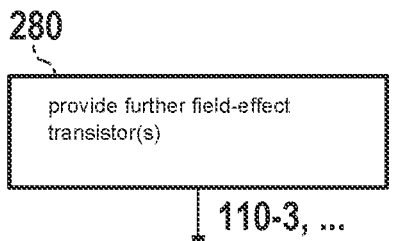
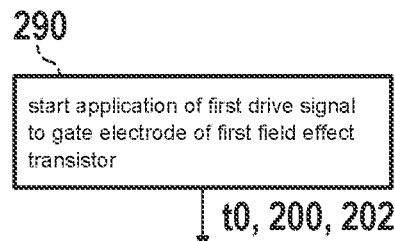
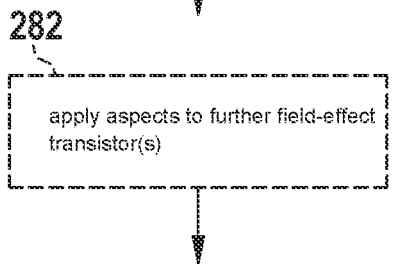
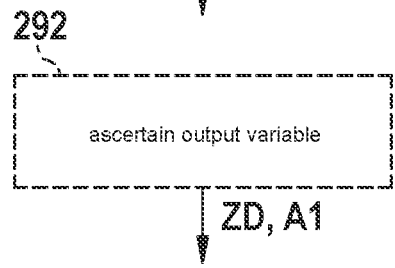
Fig. 12
Fig. 13
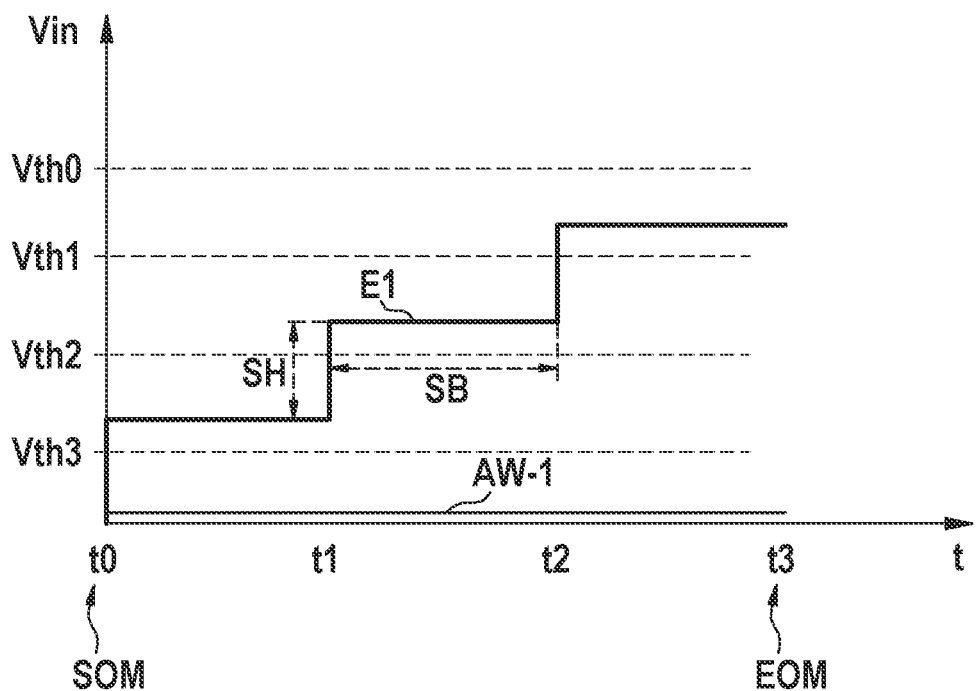
Fig. 14

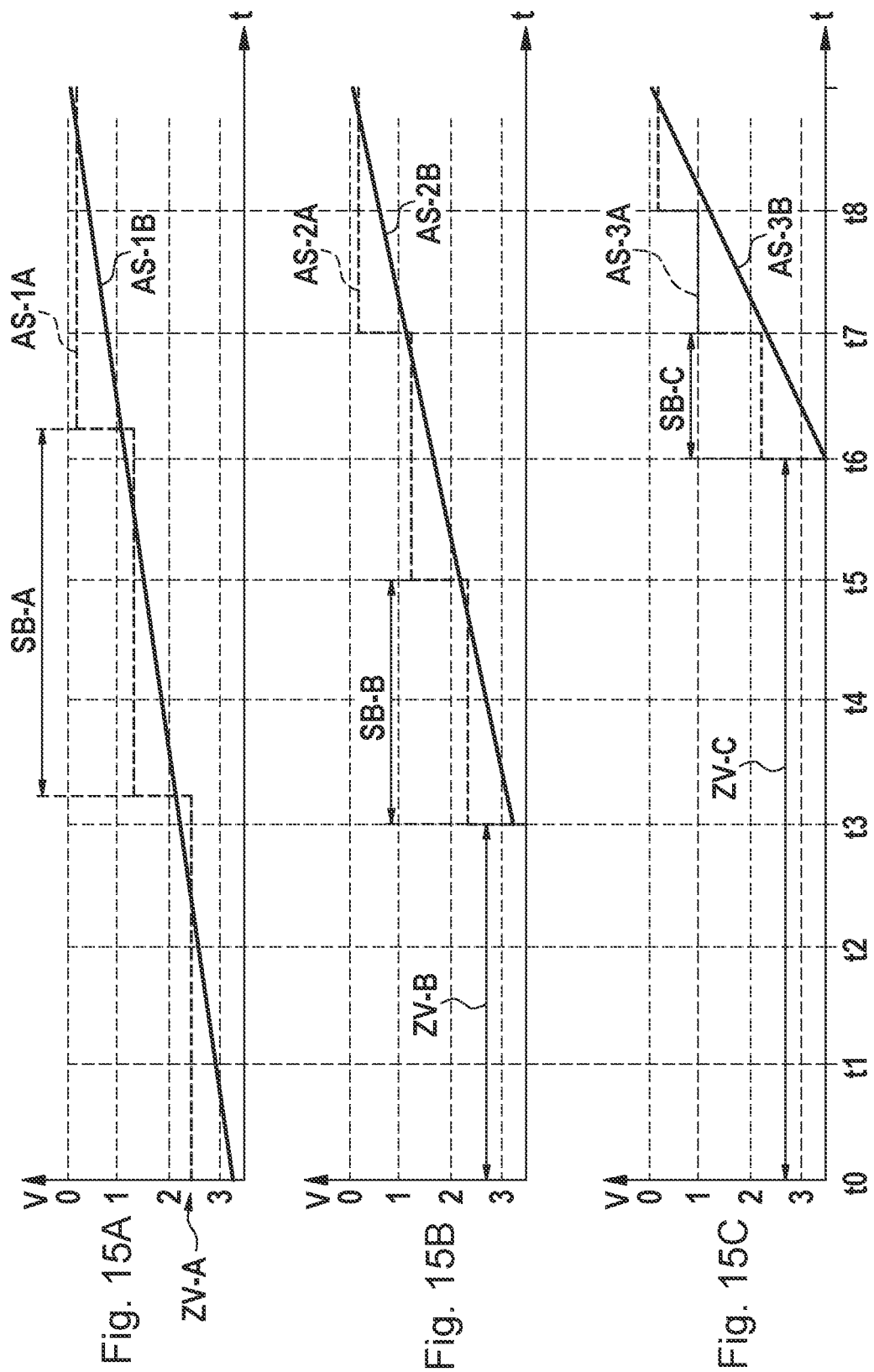

METHOD FOR PROCESSING INPUT VARIABLES BY MEANS OF A PROCESSING DEVICE COMPRISING AT LEAST TWO FIELD-EFFECT TRANSISTORS, DEVICE FOR EXECUTING THE METHOD, COMPUTING DEVICE, AND USE

FIELD

The present invention relates to a method for processing input variables by means of a processing device comprising at least two field-effect transistors.

The present invention further relates to a device for executing a method for processing input variables by means of a processing device comprising at least two field-effect transistors.

SUMMARY

Exemplary embodiments of the present invention relate to a method for processing input variables by means of a processing device comprising at least two field-effect transistors (FET), for example ferroelectric field-effect transistors (FeFET), wherein drain-to-source paths of the at least two field-effect transistors are each connected to a first circuit node, wherein the method comprises: applying to a gate electrode of the first field-effect transistor a first drive signal which characterizes a first input variable associated with the first field-effect transistor; applying to a gate electrode of the second field-effect transistor a second drive signal which characterizes an input variable associated with the second field-effect transistor, wherein at least one of the first drive signal and/or of the second drive signal has a non-constant amplitude at least periodically. In other words, in further exemplary embodiments, either the first drive signal and/or the second drive signal has a non-constant amplitude at least periodically.

In further exemplary embodiments of the present invention, for example, a calculation based on the first input variables can, for example, be carried out using the field-effect transistors, i.e., for example, hardware-based.

In further exemplary embodiments of the present invention, it is provided that the method comprise: ascertaining an output variable based on a first variable characterizing a time curve of a summation current associated with the first circuit node, wherein, for example, the output variable characterizes a sum that can be formed and/or has been formed at least on the basis of the first drive signal and the second drive signal.

In further exemplary embodiments of the present invention, it is provided that ascertainment comprise at least one of the following elements: a) converting the summation current into a, for example, first digital (time- and/or value-discrete) variable, for example by means of a current-based analog/digital converter which, for example, receives the summation current as an input variable, and transforms the summation current into the first digital variable; b) converting the summation current into a first voltage, for example by charging a capacitor by means of the summation current, and converting the first voltage into a, for example, second digital variable, for example by means of a voltage-based analog/digital converter.

In further exemplary embodiments of the present invention, it is provided that the method comprise at least one of the following elements: a) providing the first field-effect transistor with a first threshold voltage, which characterizes a second input variable associated with the first field-effect transistor; b) providing the second field-effect transistor with a second threshold voltage, which characterizes a second input variable associated with the second field-effect transistor; c) programming, for example reprogramming, the first threshold voltage of the first field-effect transistor (for example, when the first field-effect transistor takes the form of an FeFET), for example by means of an optional programming device; d) programming, for example reprogramming, the second threshold voltage of the second field-effect transistor (for example, when the second field-effect transistor takes the form of an FeFET), for example by means of the optional programming device.

In further exemplary embodiments of the present invention, it is provided that at least one of the at least two field-effect transistors have a corresponding current-limiting function for limiting a current through its drain-to-source path, wherein the current-limiting function is implemented by means of at least one of the following elements: a) a setting of a gate voltage, for example such that a maximum prespecifiable current through the drain-to-source path is not exceeded; b) a current-limiting element, for example a resistor or a transistor configured as a resistor, for example a field-effect transistor, in series with the drain-to-source path (for example connected to a drain electrode and/or to a source electrode).

In further exemplary embodiments of the present invention, it is provided that at least one of the first drive signal and/or of the second drive signal comprise at least one of the following time curves, at least periodically: a) stepped form, for example a rising stepped form, wherein, for example, the stepped form can be characterized by at least one of the following elements: a1) step width; a2) step height; a3) time offset, for example relative to a reference time; b) rising, for example rising monotonically. In further exemplary embodiments, at least one of the drive signals can also have a non-constant, e.g., time-variable, step width and/or step height.

In other words, in further exemplary embodiments of the present invention, a time curve can be used at least periodically for at least one of the first drive signal and/or of the second drive signal, which curve, for example instead of a stepped form, has a linear course, for example monotonically rising at least on average over time.

In further exemplary embodiments of the present invention, it is provided that the method comprise: specifying, for example using, a first step width for the stepped form of the first drive signal, specifying, for example using, a second step width for the stepped form of the second drive signal, wherein, for example, specifying the first step width comprises specifying the first step width on the basis of the first input variable associated with the first field-effect transistor, wherein, for example, specifying the second step width comprises specifying the second step width on the basis of the first input variable associated with the second field-effect transistor. In further exemplary embodiments, the first step width is different from the second step width. In further exemplary embodiments, the first step width is equal to the second step width.

In further exemplary embodiments of the present invention, it is provided that the method comprise at least one of the following elements: a) specifying, for example using, a first time offset, for example in relation to a reference time (for example, starting time for a measurement), for applying the first drive signal to the gate electrode of the first field-effect transistor, wherein, for example, specifying the first time offset comprises specifying the first time offset on the basis of the first input variable associated with the first field-effect transistor; b) specifying, for example using, a second time offset, for example relative to the reference time, for applying the second drive signal to the gate electrode of the second field-effect transistor, wherein, for example, specifying the second time offset comprises specifying the second time offset on the basis of the first input variable associated with the second field-effect transistor. In further exemplary embodiments, the first time offset is different from the second time offset. In further exemplary embodiments, the first time offset is equal to the second time offset.

In further exemplary embodiments of the present invention, it is provided that the method comprise: specifying, for example using, a first amplitude value for at least one of the first drive signal and/or of the second drive signal when the first input variable associated with the corresponding first and/or second field-effect transistors has a value less than a prespecifiable minimum value, for example a value of zero, wherein the first amplitude value is, for example by a prespecifiable amount, lower than a threshold voltage, for example a lowest possible threshold voltage, of the first and/or second field-effect transistor in question. In further exemplary embodiments, a leakage current can thereby be reduced, for example in cases in which the first input variable has the value zero. In further exemplary embodiments, the first amplitude value can also be negative, for example.

In further exemplary embodiments of the present invention, it is provided that the method comprise: specifying, for example using, a first slope for the rising time curve of the first drive signal; specifying, for example using, a second slope for the rising time curve of the second drive signal, wherein, for example, specifying the first slope comprises specifying the first slope on the basis of the first input variable associated with the first field-effect transistor, wherein, for example, specifying the second slope comprises specifying the second slope on the basis of the first input variable associated with the second field-effect transistor. In further exemplary embodiments, the first slope is different from the second slope. In further exemplary embodiments, the first slope is equal to the second slope.

In further exemplary embodiments of the present invention, it is provided that the method comprise at least one of the following elements: a) at least periodically limiting a first current through the drain-to-source path of the first field-effect transistor, for example by means of a first current-limiting element, for example comprising a resistor or a transistor configured as a resistor, for example a field-effect transistor, wherein, for example, limiting the first current through the drain-to-source path of the first field-effect transistor comprises a limiting of the first current on the basis of the first input variable associated with the first field-effect transistor; b) at least periodically limiting a second current through the drain-to-source path of the second field-effect transistor, for example by means of a second current-limiting element, for example comprising a resistor or a transistor configured as a resistor, for example a field-effect transistor, wherein, for example, limiting the second current through the drain-to-source path of the second field-effect transistor comprises a limiting of the second current on the basis of the first input variable associated with the second field-effect transistor.

In further exemplary embodiments of the present invention, it is provided that the method comprise: specifying, for example using, for example, an increasing, first logarithmic step width for the stepped form of the first drive signal, which step width changes logarithmically over time; specifying, for example, using, for example, an increasing, second logarithmic step width for the stepped form of the second drive signal, which step width changes logarithmically over time, wherein, for example, specifying the first logarithmic step width comprises specifying the first logarithmic step width on the basis of the first input variable associated with the first field-effect transistor, wherein, for example, specifying the second logarithmic step width comprises specifying the second logarithmic step width on the basis of the first input variable associated with the second field-effect transistor.

In further exemplary embodiments of the present invention, for example, even a step height can be changed and, for example, a step width retained, for example for at least one of the first drive signal and/or of the second (or optionally a further) drive signal.

In further exemplary embodiments of the present invention, for example, even a step height can be changed, for example, and the step width can also be changed, for example, for at least one of the first drive signal and/or of the second (or possibly a further) drive signal.

In further exemplary embodiments of the present invention, it is provided that the processing device comprise more field-effect transistors than the at least two field-effect transistors, wherein at least some aspects of at least one of the preceding embodiments are applied to at least some field-effect transistors of the more than two field-effect transistors. In other words, the principle according to the embodiments in further exemplary embodiments is also applicable to more than two field-effect transistors. In further exemplary embodiments, at least some of the plurality of field-effect transistors are designed as FeFETs.

In further exemplary embodiments of the present invention, it is provided that the method comprise: starting application of the first drive signal to the gate electrode of the first field-effect transistor and applying at a reference time the second drive signal to the gate electrode of the second field-effect transistor; ascertaining the output variable after a prespecifiable time period. In further exemplary embodiments, during the prespecifiable period of time, for example, the summation current can be evaluated or a voltage that can be derived therefrom (for example by means of the above-described charging of the capacitor by means of the summation current), wherein the individual field-effect transistors in each case make a temporal contribution to the summation current which is based on the corresponding first and/or second input variables.

Further exemplary embodiments of the present invention relate to a device for performing the method according to the embodiments.

In further exemplary embodiments of the present invention, it is provided that the device comprise a processing device comprising at least two field-effect transistors, for example ferroelectric field-effect transistors, wherein, for example, the processing device n comprises n many, n>1, field-effect transistors, for example ferroelectric field-effect transistors. In some exemplary embodiments, n>10 or n>100 or more may apply.

In further exemplary embodiments of the present invention, it is provided that the device comprise at least one analog/digital converter, for example a current-based analog/digital converter and/or a voltage-based analog/digital converter.

In further exemplary embodiments of the present invention, it is provided that the device comprise at least one capacitor which can be charged at least periodically by means of the summation current. In further exemplary embodiments, the capacitor accumulates, for example integrates, the current contributions of the individual field-effect transistors, said contributions for example changing over time, so that the output variable, for example, based on the voltage of the capacitor (for example, when observed at an end of a measurement period) can be ascertained.

In further exemplary embodiments of the present invention, it is provided that the device comprise a discharge device for at least periodically discharging the capacitor, whereby, for example, a "result" of a preceding calculation can be reset by means of the processing device, so that, for example, a further calculation can be carried out. For example, the discharge device can comprise at least one discharge transistor or switch.

In further exemplary embodiments of the present invention, it is provided that the device comprise a programming device for programming, for example reprogramming, at least one of the following elements: a) first threshold voltage of the first field-effect transistor (e.g., FeFET); b) second threshold voltage of the second field-effect transistor (e.g., FeFET). In the case of more than two field-effect transistors, the programming device can also be used, for example, to program the more than two field-effect transistors.

In further exemplary embodiments of the present invention, it is provided that the device comprise at least one of the following elements: a) a first current-limiting element, for example comprising a resistor or a transistor configured as a resistor, for example a field-effect transistor, for at least periodically limiting a first current through the drain-to-source path of the first field-effect transistor; b) a second current-limiting element, for example comprising a resistor or a transistor configured as a resistor, for example a field-effect transistor, for at least periodically limiting a second current through the drain-to-source path of the second field-effect transistor.

In further exemplary embodiments of the present invention, it is provided that a) the first current-limiting element be designed to limit the first current non-constantly over time, for example variably, for example on the basis of the first input variable associated with the first field-effect transistor, and/or wherein b) the second current-limiting element is designed to limit the second current non-constantly over time, for example variably, for example on the basis of the first input variable associated with the second field-effect transistor.

In further exemplary embodiments of the present invention, it is provided that the device comprise at least one driver device which is designed to provide at least periodically one of the following elements: a) the first drive signal; b) the second drive signal, wherein, for example, the control device is designed c1) to apply the first drive signal at least periodically to the gate electrode of the first field-effect transistor, and/or c2) to apply the second drive signal to the gate electrode of the second field-effect transistor.

In further exemplary embodiments of the present invention, it is provided that the device comprise a control device which is designed to execute at least one of the following elements: a) control of at least one component of the device; b) execution of at least one aspect of the method according to the embodiments of the present invention.

Further exemplary embodiments of the present invention relate to a computing device, for example a vector-matrix multiplication device, comprising at least one device according to the embodiments of the present invention.

Further exemplary embodiments of the present invention relate to a use of the method according to the embodiments and/or of the device according to the embodiments and/or of the computing device according to the embodiments for at least one of the following elements: a) execution of compute-in-memory methods, for example with weights and/or input variables which can in each case have a plurality of bits; b) artificial neural networks, for example artificial deep neural networks; c) image processing; d) efficient execution of calculations; e) increasing an efficiency for the execution of calculations; f) automated driving; g) machine learning, for example inference.

Further features, possible applications and advantages of the present invention will be apparent from the following description of exemplary embodiments of the present invention shown in the figures. In this case, all of the features described or shown form the subject matter of the present invention individually or in any combination, irrespective of their wording or representation in the description or in the figures.

BRIEF DESCRIPTION OF THE DRAWINGS

FIG. 3 schematically shows a simplified flowchart according to further exemplary embodiments of the present invention.

FIG. 4 schematically shows a simplified diagram according to further exemplary embodiments of the present invention.

FIG. 5 schematically shows a time curve of an amplitude according to further exemplary embodiments of the present invention.

FIG. 12 schematically shows a simplified flowchart according to further exemplary embodiments of the present invention.

FIG. 13 schematically shows a simplified flowchart according to further exemplary embodiments of the present invention.

FIG. 14 schematically shows time curves according to further exemplary embodiments of the present invention.

FIG. 15A schematically shows drive signals according to further exemplary embodiments of the present invention.

FIG. 15B schematically shows drive signals according to further exemplary embodiments of the present invention.

FIG. 15C schematically shows drive signals according to further exemplary embodiments of the present invention.

DETAILED DESCRIPTION OF EXAMPLE EMBODIMENTS

Figure 1:
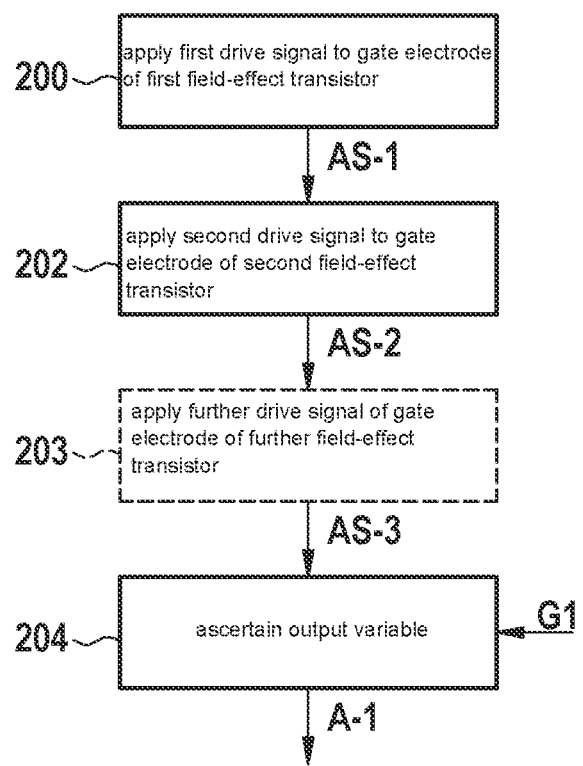
FIG. 1 schematically shows a simplified flowchart according to exemplary embodiments of the present invention.
Figure 2:
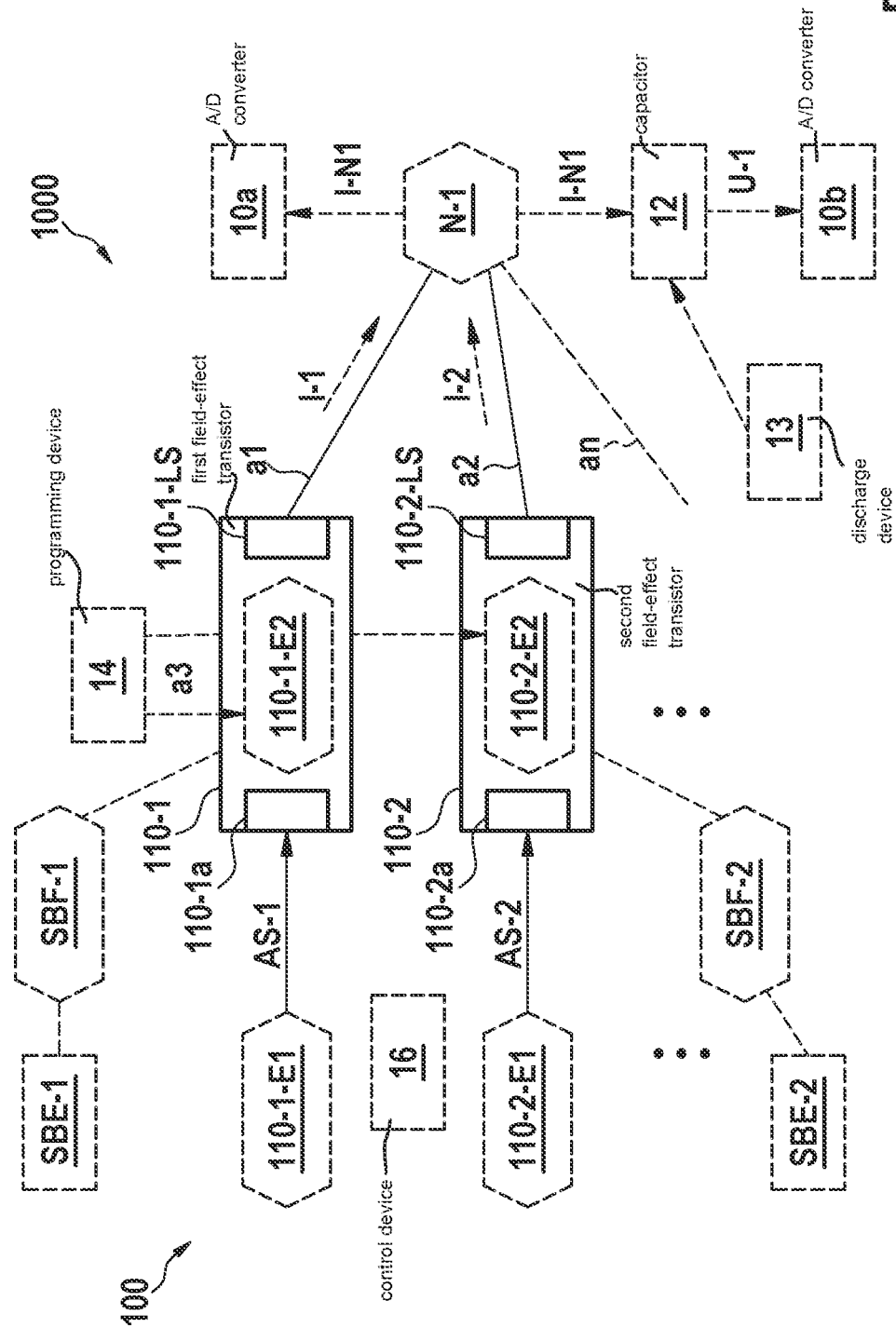
FIG. 2 schematically shows a simplified block diagram according to further exemplary embodiments of the present invention.

Exemplary embodiments, cf. FIGS. 1, 2, relate to a method for processing input variables by means of a processing device 100 comprising at least two field-effect transistors (FET), for example ferroelectric field-effect transistors (FeFET) 110-1, 110-2, . . . (FIG. 2) (in further exemplary embodiments other FET types are also possible), wherein drain-to-source paths 110-1-LS, 110-2-LS of the at least two field-effect transistors 110-1, 110-2, . . . are each connected to a first circuit node N-1, see the connections a1, a2, wherein the method comprises: applying 200 (FIG. 1) to a gate electrode 110-1a (FIG. 2) of the first field-effect transistor 110-1 a first drive signal AS-1 (for example, first drive voltage) which characterizes a first input variable 110-1-E1 associated with the first field-effect transistor 110-1; applying 202 to a gate electrode 110-2a of the second field-effect transistor 110-2 a second drive signal AS-2 (for example, second drive voltage) which characterizes a first input variable 110-2-E1 associated with the second field-effect transistor 110-2, wherein at least one of the first drive signal AS-1 and/or of the second drive signal AS-1 has a non-constant amplitude at least periodically. In other words, in further exemplary embodiments, either the first drive signal AS-1 and/or the second drive signal AS-2 has a non-constant amplitude at least periodically. In further exemplary embodiments, for example, a calculation based on the first input variables 110-1-E1, 110-2-E1 can be carried out using the field-effect transistors 110-1, 110-2, i.e., for example, hardware-based.

In further exemplary embodiments, FIG. 2, even more than two field-effect transistors 110-1, 110-2 can also be provided, which is indicated in FIG. 2 by the dots " . . . " and the dashed line. Optionally, in further exemplary embodiments, for example, the further optionally provided field-effect transistors can also be supplied with a respective drive signal; see by way of example the optional block 203 according to FIG. 1 and the one further drive signal AS-3 shown by way of example.

In further exemplary embodiments, FIG. 1, it is provided that the method comprise: ascertaining 204 an output variable A-1 based on a first variable G1 characterizing a time curve of a summation current I-N1 associated with the first circuit node N-1, wherein, for example, the output variable A-1 characterizes a sum that can be formed and/or has been formed at least on the basis of the first drive signal AS-1 and the second drive signal AS-2.

In further exemplary embodiments, the output variable A-1 can also characterize, for example, a weighted sum, which can be formed, among other things, on the basis of the first drive signal AS-1 and the second drive signal AS-2, which is possible, for example, by the provision of optional second input variables 110-1-E2, 110-2-E2, . . . associated with the FETs 110-1, 110-2, . . . according to further exemplary embodiments; see, for example, below with reference to FIG. 4.

In further exemplary embodiments, FIG. 3, it is provided that ascertainment 204 (FIG. 1) comprise at least one of the following elements: a) converting 204a the summation current I-N1 into a, for example, first digital (time- and/or value-discrete) variable DG1, for example by means of a current-based analog/digital converter 10a (FIG. 2), which, for example, receives the summation current I-N1 as an input variable, and transforms the summation current I-N1 into the first digital variable DG1; b) converting 204b (FIG. 4) the summation current I-N1 into a first voltage U-1, for example by charging a capacitor 12 (FIG. 2) by means of the summation current I-N1, and converting 204c (FIG. 4) the first voltage U-1 into a, for example second, digital variable DG2, for example by means of a voltage-based analog/digital converter 10b.

In further exemplary embodiments, FIG. 4, it is provided that the method comprise at least one of the following elements: a) providing 210 the first field-effect transistor 110-1 with a first threshold voltage Vth-1, which characterizes a second input variable 110-1-E2 (FIG. 2) associated with the first field-effect transistor 110-1; b) providing 212 the second field-effect transistor 110-2 with a second threshold voltage Vth-2, which characterizes a second input variable 110-2-E2 associated with the second field-effect transistor 110-2; c) programming 214, for example reprogramming, the first threshold voltage Vth-1 of the first field-effect transistor 110-1 (for example, when the first field-effect transistor takes the form of an FeFET), for example by means of an optional programming device 14 (see also the arrows a3 according to FIG. 2); d) programming 216, for example reprogramming, the second threshold voltage Vth-2 of the second field-effect transistor 110-2 (for example, when the second field-effect transistor takes the form of an FeFET), for example by means of the optional programming device 14.

In further exemplary embodiments, by programming different threshold voltages, e.g., a position of a characteristic curve indicating a drain current of the (Fe) FET 110-1, 110-2 with respect to a gate-source voltage can be changed, for example displaced along a gate-source voltage coordinate, thereby providing further degrees of freedom for calculations by means of the processing device 100 (FIG. 2).

In further exemplary embodiments, FIG. 2, it is provided that at least one of the at least two field-effect transistors 110-1, 110-2 have a corresponding current-limiting function SBF-1, SBF-2 for limiting a current I-1, 1-2 through its drain-to-source path 110-1-LS, 110-2-LS, wherein the current-limiting function SBF-1, SBF-2 is implemented by means of at least one of the following elements: a) a setting of a gate voltage, for example such that a maximum pre-specifiable current through the respective drain-to-source path 110-1-LS, 110-2-LS is not exceeded; b) a current-limiting element SBE-1, SBE-2, for example a resistor or transistor configured as a resistor, for example a field-effect transistor, in series with the respective drain-to-source path 110-1-LS, 110-2-LS (for example connected to a drain electrode and/or to a source electrode of the relevant FET 110-1, 110-2).

Figure 6:
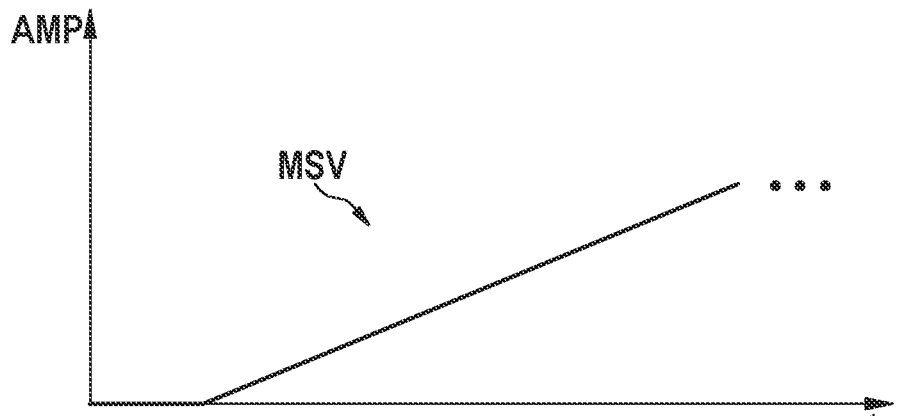
FIG. 6 schematically shows a time curve of an amplitude according to further exemplary embodiments of the present invention.

In further exemplary embodiments, FIG. 5, 6, it is provided that at least one of the first drive signal AS-1 and/or of the second drive signal AS-2 have at least one of the following time curves, at least periodically: a) stepped form, for example a rising stepped form, TF, see the exemplary time curve of the amplitude AMP according to FIG. 5, wherein, for example, the stepped form TF can be characterized by at least one of the following elements: a1) step width SB; a2) step height SH; a3) time offset ZV, for example in relation to a reference time to; b) rising, for example rising monotonically; see for example the monotonically rising time curve MSV of the amplitude AMP according to FIG. 6.

In further exemplary embodiments, FIG. 5, at least one of the drive signals AS-1, AS-2 can also have a non-constant, e.g., time-variable, step width SB and/or step height SH.

Figure 7:
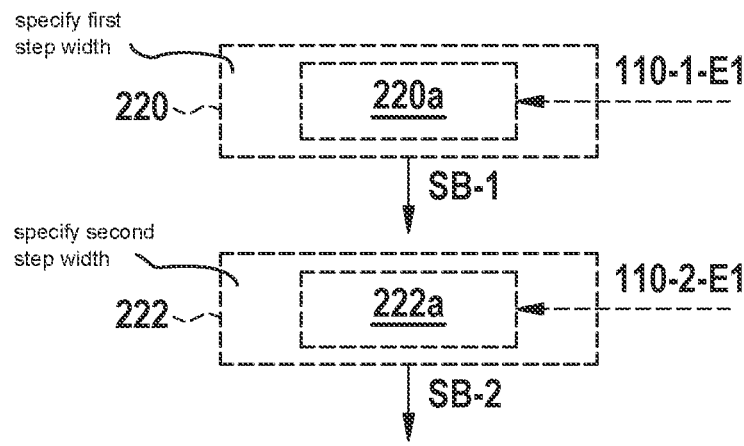
FIG. 7 schematically shows a simplified flowchart according to further exemplary embodiments of the present invention.

In further exemplary embodiments, FIG. 7, it is provided that the method comprise: specifying 220, for example using, a first step width SB-1 for the stepped form TF (FIG. 5) of the first drive signal AS-1; specifying 222, for example using, a second step width SB-2 for the stepped form TF of the second drive signal AS-2, wherein, for example, specifying 220 the first step width SB-1 comprises specifying 220a the first step width SB-1 on the basis of the first input variable 110-1-E1 associated with the first field-effect transistor 110-1, wherein, for example, specifying 222 the second step width SB-2 for example, specifying the second step width comprises specifying 222a the second step width SB-2 on the basis of the first input variable 110-2-E1 associated with the second field-effect transistor 110-2. In further exemplary embodiments, the first step width SB-1 is different from the second step width SB-2. In further exemplary embodiments, the first step width SB-1 is equal to the second step width SB-2.

Figure 8:
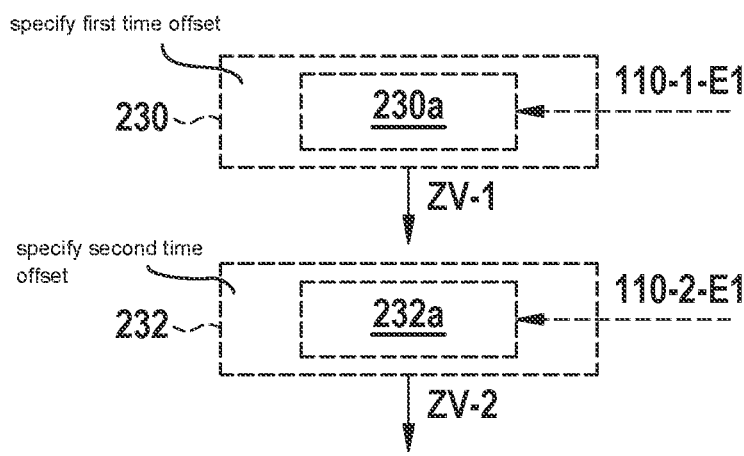
FIG. 8 schematically shows a simplified flowchart according to further exemplary embodiments of the present invention.

In further exemplary embodiments, FIG. 8, it is provided that the method comprise at least one of the following elements: a) specifying 230, for example using, a first time offset ZV-1, for example in relation to a reference time to (FIG. 5) (for example, starting time for a measurement), for applying 200 the first drive signal AS-1 to the gate electrode 110-1a of the first field-effect transistor 110-1, wherein, for example, specifying 230 the first time offset ZV-1 comprises specifying 230a the first time offset ZV-1 on the basis of the first input variable 110-1-E1 associated with the first field-effect transistor 110-1; b) specifying 232, for example using, a second time offset ZV-2, for example relative to the reference time to, for applying 202 the second drive signal AS-2 to the gate electrode 110-2a of the second field-effect transistor 110-2, wherein, for example, specifying 232 the second time offset ZV-2 comprises specifying 232a the second time offset ZV-2 on the basis of the first input variable 110-2-E1 associated with the second field-effect transistor 110-2. In further exemplary embodiments, the first time offset ZV-1 is different from the second time offset ZV-2. In further exemplary embodiments, the first time offset ZV-1 is equal to the second time offset ZV-2.

Figure 9:
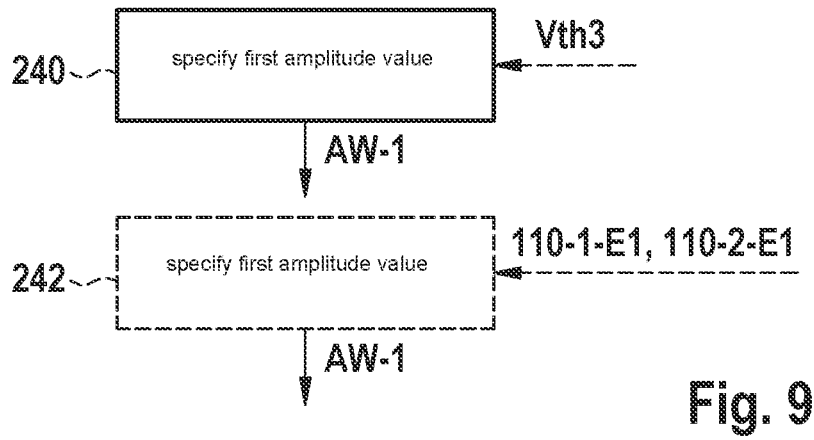
FIG. 9 schematically shows a simplified flowchart according to further exemplary embodiments of the present invention.

In further exemplary embodiments, FIG. 9, it is provided that the method comprise: specifying 240, for example using 242, a first amplitude value AW-1 for at least one of the first drive signal AS-1 and/or of the second drive signal AS-2 when the first input variable 110-1-E1, 110-2-E1 associated with the corresponding first and/or second field-effect transistor 110-1, 110-2 has a value less than a prespecifiable minimum value, for example a value of zero, wherein the first amplitude value AW-1 is, for example by a prespecifiable amount, lower than a threshold voltage, for example a lowest possible threshold voltage Vth3, of the first and/or second field-effect transistors 110-1, 110-2 in question. In further exemplary embodiments, a leakage current can thereby be reduced, for example in cases in which the first input variable 110-1-E1, 110-2-E1 has the value zero. In further exemplary embodiments, the first amplitude value AW-1 can also be negative, for example.

Figure 10:
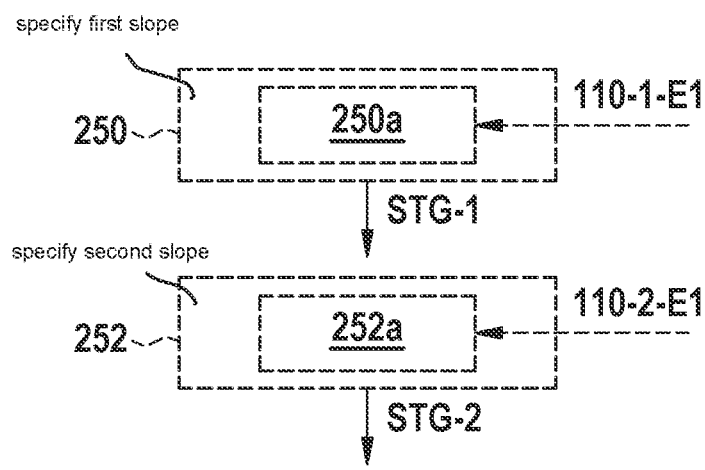
FIG. 10 schematically shows a simplified flowchart according to further exemplary embodiments of the present invention.

In further exemplary embodiments, FIG. 10, it is provided that the method comprise: specifying 250, for example using, a first slope STG-1 for the rising time curve MSV (FIG. 6) of the first drive signal AS-1; specifying 252, for example using, a second slope STG-2 for the rising time curve of the second drive signal AS-2, wherein, for example, specifying 250 the first slope STG-1 comprises specifying 250a the first slope STG-1 on the basis of the first input variable 110-1-E1 associated with the first field-effect transistor 110-1, wherein, for example, specifying 252 the second slope STG-2 comprises specifying 252a the second slope STG-2 on the basis of the first input variable 110-2-E1 associated with the second field-effect transistor 110-2. In further exemplary embodiments, the first slope STG-1 is different from the second slope STG-2. In further exemplary embodiments, the first slope STG-1 is equal to the second slope STG-2.

Figure 11:
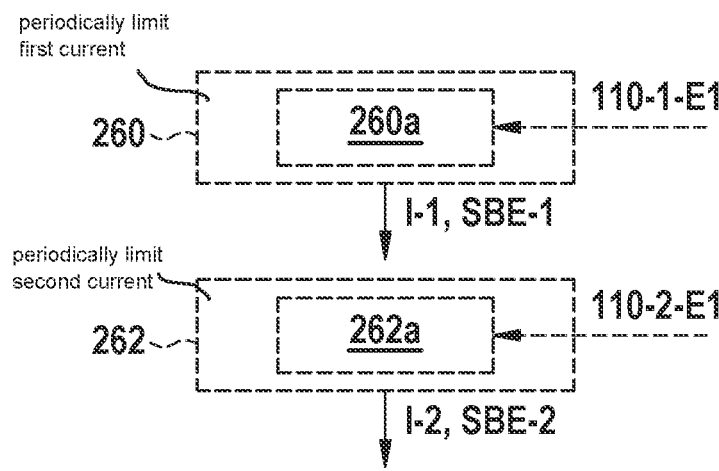
FIG. 11 schematically shows a simplified flowchart according to further exemplary embodiments of the present invention.

In further exemplary embodiments, FIG. 11, it is provided that the method comprise at least one of the following elements: a) at least periodically limiting 260 a first current I-1 through the drain-to-source path 110-1-LS (FIG. 2) of the first field-effect transistor 110-2, for example by means of a first current-limiting element SBE-1, for example comprising a resistor or a transistor configured as a resistor, for example a field-effect transistor, wherein, for example, limiting 260 the first current I-1 through the drain-to-source path of the first field-effect transistor comprises a limiting 260a of the first current I-1 on the basis of the first input variable 110-1-E1 associated with the first field-effect transistor 110-1; b) at least periodically limiting 262 a second current I-2 through the drain-to-source path 110-2-LS of the second field-effect transistor 110-2, for example by means of a second current-limiting element SBE-2, for example comprising a resistor or a transistor configured as a resistor, for example a field-effect transistor, wherein, for example, limiting 262 the second current I-2 through the drain-to-source path of the second field-effect transistor comprises a limiting 262*a* of the second current I-2 on the basis of the first input variable 110-2-E1 associated with the second field-effect transistor 110-2.

In further exemplary embodiments, it is provided that the method comprise: specifying 270, for example using, for example, a first logarithmic step width SB-LOG-1 for the stepped form TF of the first drive signal AS-1, which step width changes, for example increases, logarithmically over time; specifying 272, for example, using, for example, an increasing, second logarithmic step width SB-LOG-2 for the stepped form TF of the second drive signal AS-2, which step width changes, for example increases, logarithmically over time, wherein, for example, specifying 270 the first logarithmic step width SB-LOG-1 comprises specifying 270*a* the first logarithmic step width SB-LOG-1 on the basis of the first input variable 110-1-E1 associated with the first field-effect transistor 110-1, wherein, for example, specifying 272 the second logarithmic step width SB-LOG-2 comprises specifying 272*a* the second logarithmic step width SB-LOG-2 on the basis of the first input variable 110-2-E1 associated with the second field-effect transistor 110-2.

In further exemplary embodiments, FIG. 12, it is provided that the processing device 100 (FIG. 2) comprise more field-effect transistors than the at least two field-effect transistors 110-1, 110-2, for example by providing 280 at least one further, for example third field-effect transistor 110-3, . . . , wherein at least some aspects according to the embodiments are applied to at least some field-effect transistors of the more than two field-effect transistors 110-1, 110-2, 110-3, . . . ; see the optional block 282 according to FIG. 12. In other words, the principle according to the embodiments in further exemplary embodiments is also applicable to more than two, for example n many, n>2, field-effect transistors.

In further exemplary embodiments, at least some of the plurality of field-effect transistors 110-1, 110-2, 110-3, . . . of the processing device 100 are designed as FeFETs.

In further exemplary embodiments, all of the plurality of field-effect transistors 110-1, 110-2, 110-3, . . . of the processing device 100 are designed as FeFETs.

In further exemplary embodiments, FIG. 13, it is provided that the method comprise: starting 290 application 200, 202 of the first drive signal to the gate electrode of the first field-effect transistor and at a reference time to applying the second drive signal to the gate electrode of the second field-effect transistor; ascertaining 292 the output variable A-1 after a prespecifiable period ZD, calculated as from the reference time to.

In further exemplary embodiments, during the prespecifiable time period ZD, for example, the summation current I-N1 can be evaluated or a voltage U-1 that can be derived therefrom (for example, by the above-described charging of the capacitor 12 by means of the summation current I-N1), wherein the individual field-effect transistors 110-1, 110-2, . . . in each case make a contribution I-1, 1-2 to the summation current I-N1, which is based on the corresponding first and/or second input variables 110-1-E1, 110-2-E1, 110-1-E2, 110-2-E2.

Further exemplary embodiments, FIG. 2, relate to a device 1000 for performing the method according to the embodiments.

In further exemplary embodiments, it is provided that the device 1000 comprise a processing device 100 comprising at least two field-effect transistors 110-1, 110-2, . . . , for example ferroelectric field-effect transistors, wherein, for example, the processing device 100 comprises n many, n>1, field-effect transistors, for example ferroelectric field-effect transistors. In some exemplary embodiments, n>10 or n>100 or more may apply.

In further exemplary embodiments, it is provided that the device 1000 comprise at least one analog/digital converter, for example a current-based analog/digital converter 10*a* and/or a voltage-based analog/digital converter 10*b*.

In further exemplary embodiments, it is provided that the device 1000 comprise at least one capacitor 12 which can be charged at least periodically by means of the summation current I-N1. In further exemplary embodiments, the capacitor 12 accumulates, for example integrates, the current contributions I-1, I-2, . . . of the individual field-effect transistors 110-1, 110-2, . . . , so that the output variable A-1, for example, based on the voltage U-1 of the capacitor 12 (for example, when observed at an end of a measurement period), can be ascertained.

In further exemplary embodiments, FIG. 2, it is provided that the device 1000 comprise a discharge device 13 for at least periodically discharging the capacitor 12, whereby, for example, a "result" of a preceding calculation can be reset by means of the processing device 100, so that, for example, a further calculation can be carried out. For example, the discharge device 13 can comprise at least one discharge transistor or switch (not shown).

In further exemplary embodiments, FIG. 2, it is provided that the device 1000 comprise a programming device 14 for programming, for example reprogramming, at least one of the following elements: a) first threshold voltage Vth-1 of the first field-effect transistor 110-1 (e.g., FeFET); b) second threshold voltage Vth-2 of the second field-effect transistor 110-2 (e.g., FeFET). In the case of more than two field-effect transistors, the programming device 14 can also be used, for example, to program the more than two field-effect transistors.

In further exemplary embodiments, FIG. 2, it is provided that the device 1000 comprise at least one of the following elements: a) a first current-limiting element SBE-1, for example comprising a resistor or a transistor, for example a field-effect transistor, configured as a resistor, for at least periodically limiting a first current through the drain-to-source path of the first field-effect transistor; b) a second current-limiting element SBE-2, for example comprising a resistor or a transistor configured as a resistor, for example a field-effect transistor, for at least periodically limiting a second current through the drain-to-source path of the second field-effect transistor.

In further exemplary embodiments, FIG. 2, it is provided that a) the first current-limiting element SBE-1 be designed to limit the first current I-1 non-constantly over time, for example variably, for example on the basis of the first input variable 110-1-E1 associated with the first field-effect transistor 110-1, and/or wherein b) the second current-limiting element SBE-2 is designed to limit the second current I-2 non-constantly over time, for example variably, for example, on the basis of the first input variable 110-2-E1 associated with the second field-effect transistor 110-2.

In further exemplary embodiments, FIG. 2, it is provided that the device 1000 comprise at least one control device 16 which is designed to provide at least periodically one of the following elements: a) the first drive signal AS-1; b) the second drive signal AS-2, wherein, for example, the control device 16 is designed c1) to apply the first drive signal AS-1, at least periodically, to the gate electrode of the first field-effect transistor 110-1 and/or c2) to apply the second drive signal AS-2 to the gate electrode of the second field-effect transistor 110-2.

In further exemplary embodiments, FIG. 2, it is provided that the device 1000 comprise a control device 300 which is designed to execute at least one of the following elements: a) control of at least one component 10a, 10b, 12, 13, 14, 16 of the device 1000; b) execution of at least one aspect of the method according to the embodiments. Details regarding a configuration of the controller 300 according to further exemplary embodiments are described further below with reference to FIG. 24.

Further exemplary embodiments, FIG. 2, relate to a computing device, for example a vector-matrix multiplication device VMM, comprising at least one device 1000 according to the embodiments.

In the following, further exemplary aspects and embodiments are described which, according to further exemplary embodiments, can be combined with one or more of the embodiments described above by way of example.

FIG. 14 schematically shows time curves of possible drive signals for at least one of the field-effect transistors 110-1, 110-2, . . . (FIG. 2) according to further exemplary embodiments, for example in the form of an input voltage Vin. Element E1 symbolizes by way of example a stepped rising time curve of a voltage which can be used for application to a gate electrode to at least one of the field-effect transistors 110-1, 110-2, . . . (FIG. 2). At the time to, the curve E1 has a first increase in amplitude, at the time t1, the curve E1 has a second rise in amplitude, at the time to, the curve E1 has a third increase in amplitude. The step width SB is, by way of example, constant and corresponds, for example, to a time unit t2–t1 according to exemplary embodiments.

Also shown in FIG. 14 are four possible threshold voltages Vth0, Vth1, Vth2, Vth3, to which, for example, at least one of the FeFETs 110-1, 110-2, 110-3, . . . is programmable. Depending on to which of the four possible threshold voltages Vth0, Vth1, Vth2, Vth3, for example, the FeFET 110-1 is programmed, its drain-to-source path 110-1-LS is conductive when the curve E1 is used as the first drive signal AS-1 for controlling its gate electrode 110-1a, namely when the drive signal AS-1 or the curve E1 exceeds the currently programmed threshold voltage. This results in a non-vanishing first current I-1 through the drain-to-source path 110-1-LS into the first circuit node N-1, which can be ascertained directly, for example, by a current-based analog/digital converter 10a, or which can be used for charging the optional capacitor 12. In further exemplary embodiments, a time curve of the first current I-1 or an associated charge (for example, on the capacitor 12) is a function of the first input variable 110-1-E1 (associated with the first drive signal AS-1) and of the second input variable 110-1-E2 (associated with the programmed threshold voltage) of the first FeFET 110-1. By way of example, the electrical charge, or a corresponding capacitor voltage or voltage change of the capacitor 12, which can be determined in a measurement period between the time to (e.g., start of a measurement, "SOM") and the time t3 (e.g., end of the measurement, "EOM") based on the first current I-1, is proportional to the first drive signal AS-1 and to the programmed threshold voltage.

If further FeFETs 110-2, . . . during the measurement period (to, t3) supply non-vanishing current contributions I-2, . . . , the electrical charge, or a corresponding capacitor voltage or voltage change of the capacitor 12, which can be ascertained in the measurement period on the basis of the plurality of current contributions, proportional to a sum of products of the corresponding drive signals AS-1, AS-2, . . . and the corresponding programmed threshold voltage of the respective FeFETs 110-1, 110-2, . . . , thus characterizes, for example, a weighted sum, wherein, for example, the respectively programmed threshold voltages of the relevant FeFETs 110-1, 110-2, . . . , characterize the weights.

FIG. 14 also shows, by way of example, the first amplitude value AW-1 (see also block 240 according to FIG. 9), which, for characterizing a first input variable with the value zero, is selected to be so small that it falls below the lowest possible value Vth3 of the programmable threshold voltages, as a result of which a corresponding FeFET does not assume its conductive state at any time during the measurement period, and therefore does not provide a current contribution.

In further exemplary embodiments, the amplitude of the curve E1, for example the step height SH, can be selected such that, upon an amplitude being reached corresponding to a simple step height SH (see, for example, time period (t0, t1)), the lowest possible threshold voltage Vth3 is exceeded sufficiently far that an FeFET (or its drain-to-source path) programmed correspondingly to the threshold voltage Vth3 is conductive, i.e., has low-impedance.

By way of example, the amplitude of the curve E1, for example the step height SH, for example, based on the possible values Vth0, Vth1, . . . can thus be selected for programmable threshold voltages such that, for example, upon twice the step height 2*SH being reached, the second lowest possible threshold voltage Vth2 is exceeded, for example is exceeded sufficiently far that an FeFET (or its drain-to-source path) programmed correspondingly to the second lowest threshold voltage Vth2 becomes conductive, i.e., has low-impedance, when the curve E1 assumes an amplitude that corresponds to twice the step height 2*SH.

By way of example, the amplitude of the curve E1, for example the step height SH, for example, based on the possible values Vth0, Vth1, . . . can be selected for programmable threshold voltages such that, upon three times the step height 3*SH being reached, for example, the third lowest possible threshold voltage Vth1 is exceeded, for example is exceeded sufficiently far that an FeFET (or its drain-to-source path) programmed correspondingly to the third lowest threshold voltage Vth1 becomes conductive, i.e., has low-impedance, when the curve E1 assumes an amplitude that corresponds to three times the step height 3*SH, and so on.

FIG. 15A schematically shows possible first drive signals AS-1A, AS-1B, for example control voltages V, for example for the first FeFET 110-1 (FIG. 2), according to further exemplary embodiments. The stepped first drive signal AS-1A has a first step width SB-A, and the monotonically increasing first drive signal AS-1B has a first slope. A time offset ZV-A of the two first drive signals AS-1A, AS-1B according to FIG. 15A is zero. Possible threshold voltages to which the FeFETs of the processing device 100 (FIG. 2) can be programmed are symbolized in FIG. 15A by the horizontal dashed straight lines and the digits "0", "1", "2", "3" along the vertical axis V. In further exemplary embodiments, starting from the reference time to, the drive signals increase from the amplitude zero up to a prespecifiable maximum value (not shown), namely the stepped first drive signal AS-1A, which by way of example has three steps, in each case at the times t0, t3, t6 (see common time axis according to FIG. 15C), and the monotonically increasing first drive signal AS-1B with the first slope, corresponding to 1/x1, wherein the value "x1" corresponds, for example, to a numerical input value for the first input variable 110-1-E1 associated with the first FeFET 110-1.

FIG. 15B schematically shows possible second drive signals AS-2A, AS-2B, for example control voltages V, for example for the second FeFET 110-2 (FIG. 2), according to further exemplary embodiments. The stepped second drive signal AS-2A has a first step width SB-B which is smaller than the first step width SB-A according to FIG. 15A, and the monotonically increasing first drive signal AS-2B has a second slope which is greater than the first slope of the drive signal AS-1B according to FIG. 15A. A time offset ZV-B of the two first drive signals AS-2A, AS-2B according to FIG. 15B is greater than zero. As a result, the drive signals AS-2A, AS-2B from time t3 increase from the amplitude zero up to the prespecifiable maximum value (not shown), namely the first drive signal AS-1B, which by way of example has three steps, in each case at the times t3, t5, t7, and the first drive signal AS-1B with a second slope which corresponds to 1/x2, wherein the value "x2" corresponds, for example, to a numerical input value for the first input variable 110-2-E1 associated with the second FeFET 110-2.

FIG. 15C schematically shows possible third drive signals AS-3A, AS-3B, for example control voltages V, for example for a third FeFET according to further exemplary embodiments. The stepped second drive signal AS-3A has a third step width SB-C which is smaller than the second step width SB-B according to FIG. 15B, and the monotonically increasing first drive signal AS-3B has a third slope which is greater than the second slope of the drive signal AS-2B according to FIG. 15B. A time offset ZV-C of the two first drive signals AS-3A, AS-3B according to FIG. 15C is greater than the time offset ZV-B from FIG. 15B. Thus, starting from the time t6, the drive signals AS-3A, AS-3B increase from the amplitude zero to the prespecifiable maximum value (not shown), namely the first drive signal AS-3B, which by way of example has three steps, in each case at the times t6, t7, t8, and the first drive signal AS-3B with a third slope, which corresponds to 1/x3, wherein the value "x3" corresponds, for example, to a numerical input value for the first input variable associated with the third FeFET.

In further exemplary embodiments, the stepped drive signals AS-1A, AS-2A, AS-3A characterize the numerical input values x1, x2, x3 in a comparable manner, relative to the monotonically increasing drive signals AS-1B, AS-2B, AS-3B. In further exemplary embodiments, the stepped drive signals AS-1A, AS-2A, AS-3A minimize leakage currents in the FeFET, compared to the monotonically increasing drive signals AS-1B, AS-2B, AS-3B.

Figure 16A:
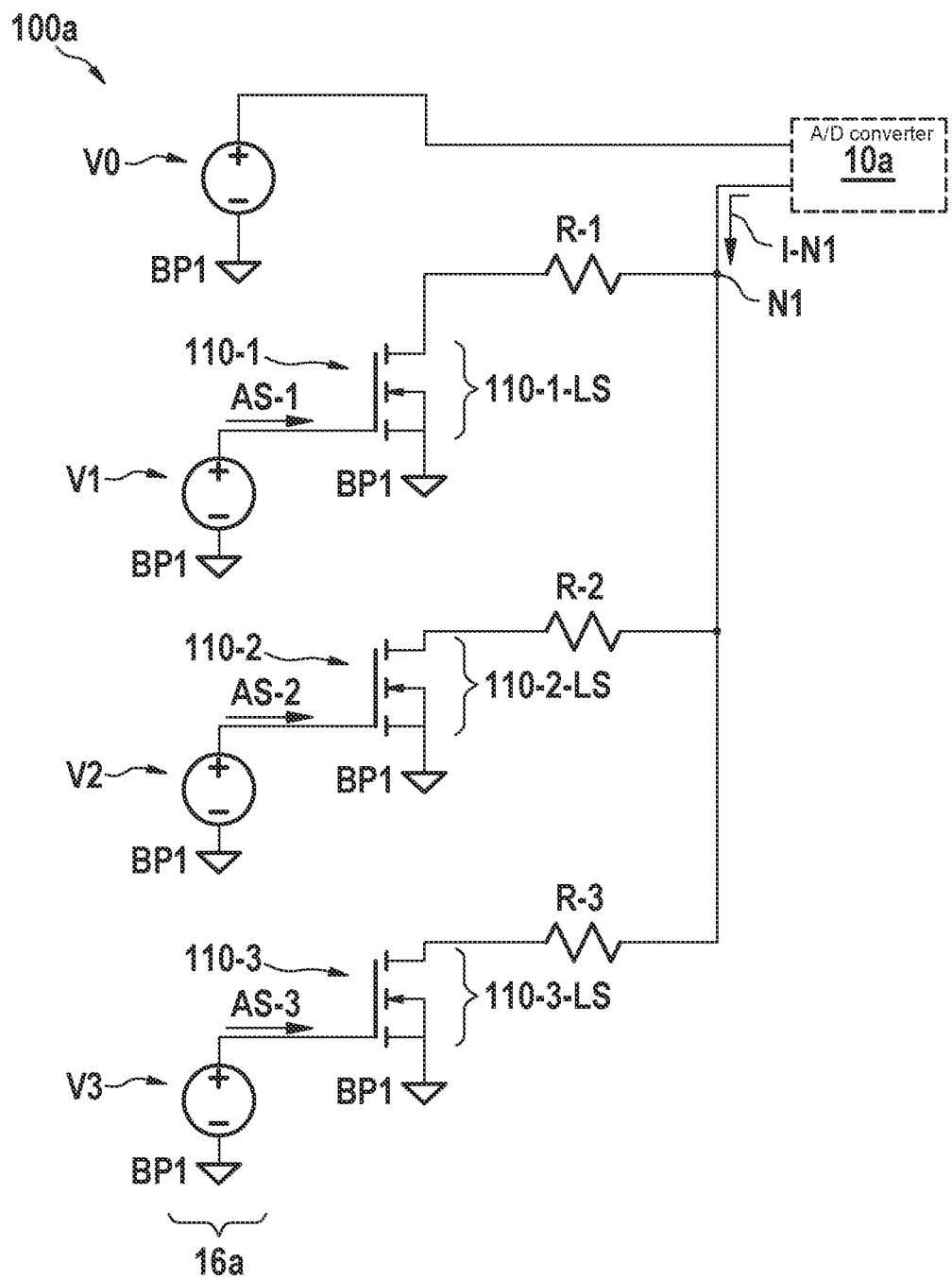
FIG. 16A schematically shows a simplified circuit diagram according to further exemplary embodiments of the present invention.

FIG. 16A schematically shows a simplified circuit diagram of a processing device 100a comprising three FeFETs 110-1, 110-2, 110-3 according to further exemplary embodiments. The drain-to-source paths 110-1-LS, 110-2-LS, 110-3-LS are in each case connected to the first circuit node N-1, namely in each case via a resistor R-1, R-2, R-3 for current limitation, for example corresponding to the elements SBE-1, SBE2, . . . according to FIG. 2. Instead of the resistors R-1, R-2, R-3, in further exemplary embodiments (not shown), an adaptation of the gate voltage (s) for at least some of the FeFETs 110-1, 110-2, 110-3 can be provided in the sense of a current limitation.

Element 16a symbolizes a control device (for example similar to element 16 according to FIG. 2), which is designed to provide, at least periodically, the first drive signal AS-1 for an application to the gate electrode of the first FeFET 110-1, for example by means of the voltage source V1, at least periodically, the second drive signal AS-2 for an application to the gate electrode of the second FeFET 110-2, for example by means of the voltage source V2, at least periodically the third drive signal AS-3 for application to the gate electrode of the third FeFET 110-3, for example by means of the voltage source V3. The element V0 symbolizes an operating voltage supply for the processing device 100a. The reference sign BP1 symbolizes a first reference potential, for example ground potential.

Figure 16B:
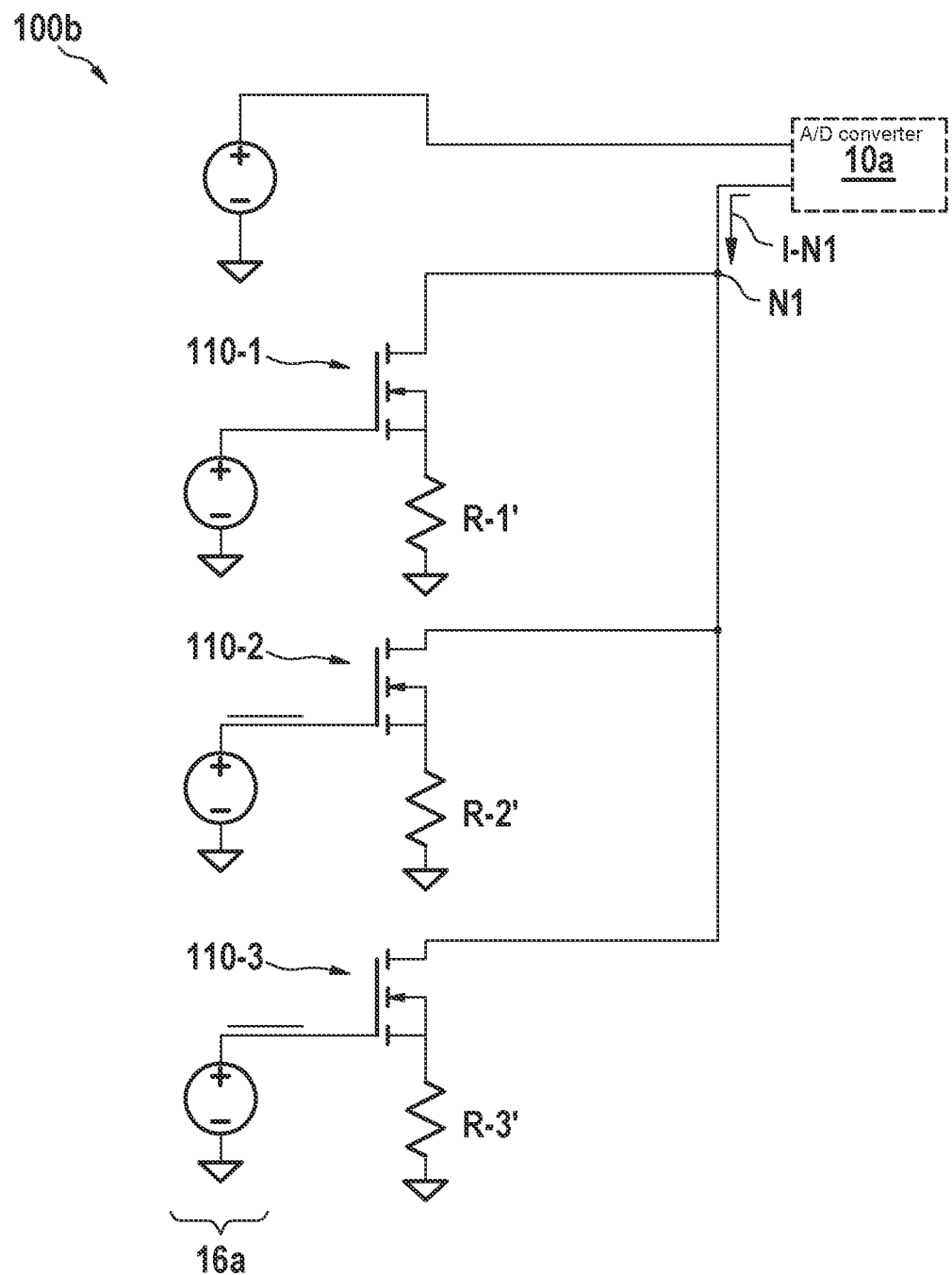
FIG. 16B schematically shows a simplified circuit diagram according to further exemplary embodiments of the present invention.

FIG. 16B schematically shows a simplified circuit diagram of a processing device 100b—similar to FIG. 16A—comprising three FeFETs 110-1, 110-2, 110-3, according to further exemplary embodiments. In contrast to FIG. 16A, in the case of the processing device 100b according to FIG. 16B, current-limiting resistors R-1', R-2', R-3' are arranged between the reference potential BP1 and a corresponding source electrode of the FeFETs, whereas the current-limiting resistors R-1, R-2, R-3 in FIG. 16A are in each case arranged between the first circuit node N-1 and a corresponding drain electrode of the FeFETs.

In both embodiments 100a, 100b according to FIG. 16A, 16B, the current-based analog/digital converter 10a can capture the summation current I-N1 and transform it into a digital representation which characterizes, for example, a calculation result of the calculations which can be carried out by means of the processing devices 100a, 100b by the three FeFETs (for example, on the basis of the drive signals AS-1, . . . and/or on the basis of programmed threshold voltages).

Figure 17A:
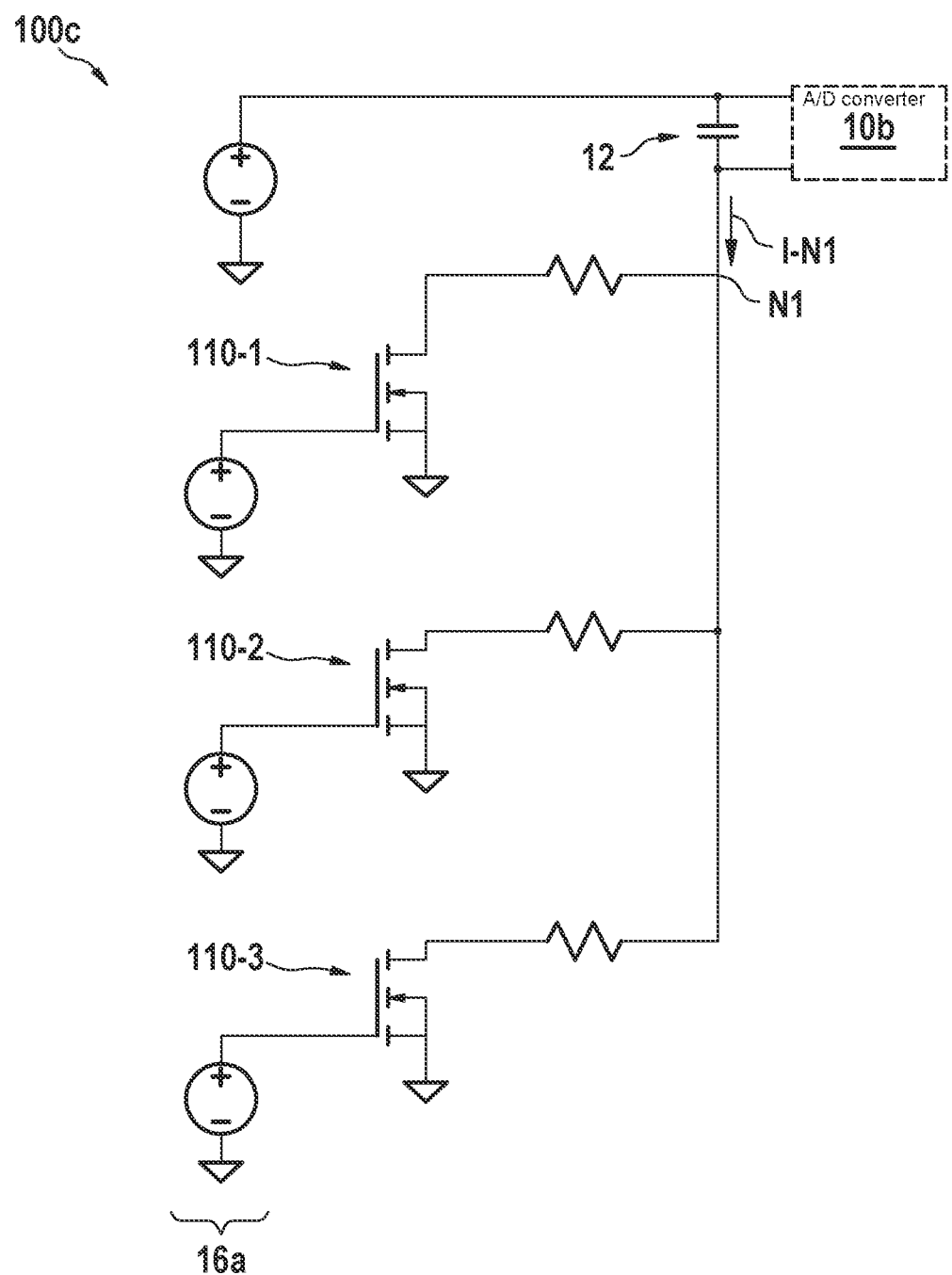
FIG. 17A schematically shows a simplified circuit diagram according to further exemplary embodiments of the present invention.

FIG. 17A schematically shows a simplified circuit diagram of a processing device 100c—similar to FIG. 16A—comprising three FeFETs 110-1, 110-2, 110-3, according to further exemplary embodiments. In contrast to FIG. 16A, in the case of the processing device 100c in FIG. 17A. the capacitor 12, which can be charged by means of the summation current I-N1, and the voltage-based analog/digital converter 10b are provided.

Figure 17B:
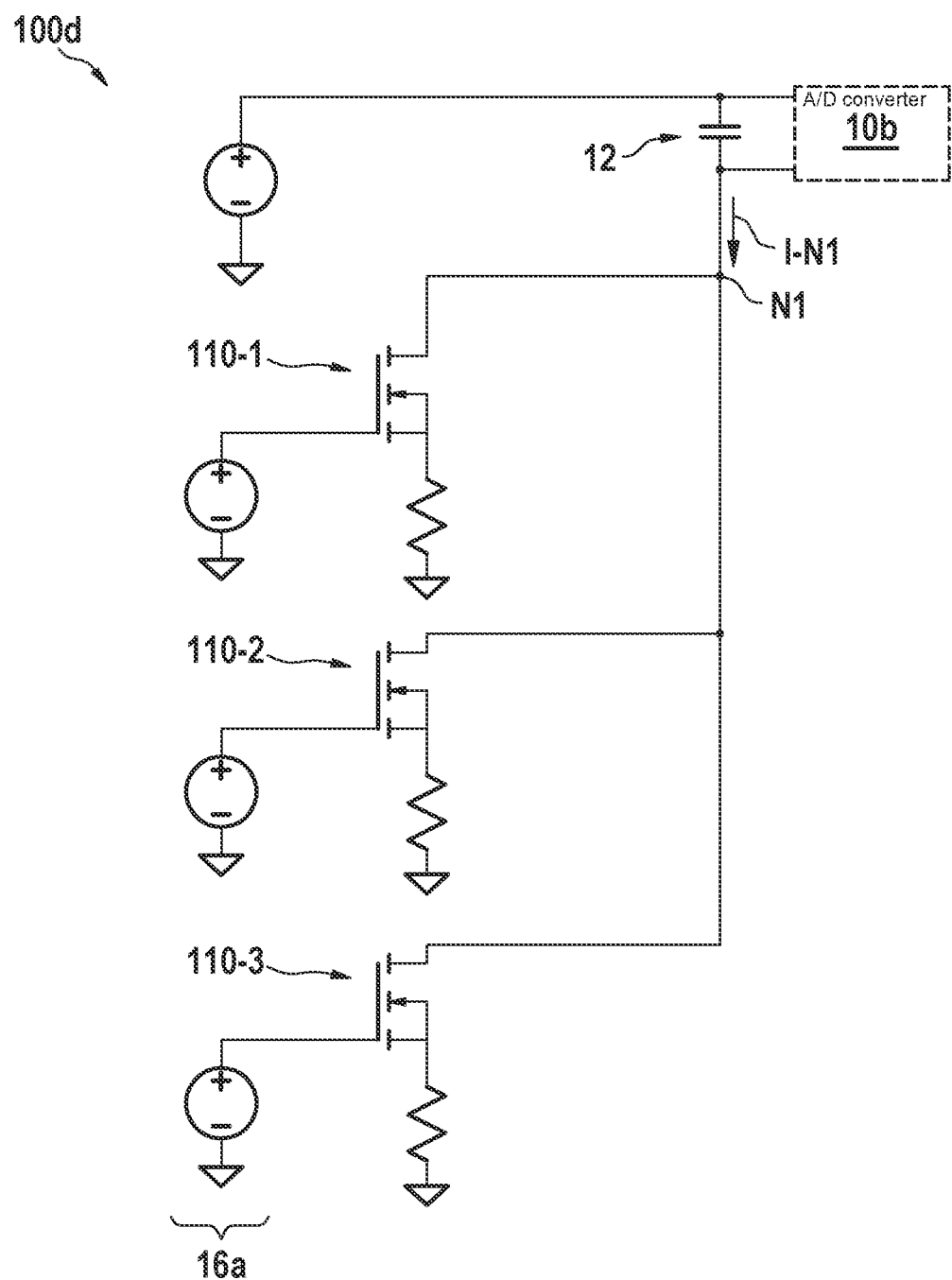
FIG. 17B schematically shows a simplified circuit diagram according to further exemplary embodiments of the present invention.

FIG. 17B schematically shows a simplified circuit diagram of a processing device 100d—similar to FIG. 16B—comprising three FeFETs 110-1, 110-2, 110-3, according to further exemplary embodiments. In contrast to FIG. 16B, in the case of the processing device 100d in FIG. 17B the capacitor 12, which can be charged by means of the summation current I-N1, and the voltage-based analog/digital converter 10b are provided.

In further exemplary embodiments, the configurations 100a, 100b, 100c, 100d described above by way of example with reference to FIG. 16A, 16B, 17A, 17B are in further exemplary embodiments in each case controllable, for example, with the drive signals described by way of example in FIG. 15A, 15B, 15C.

Figure 18:
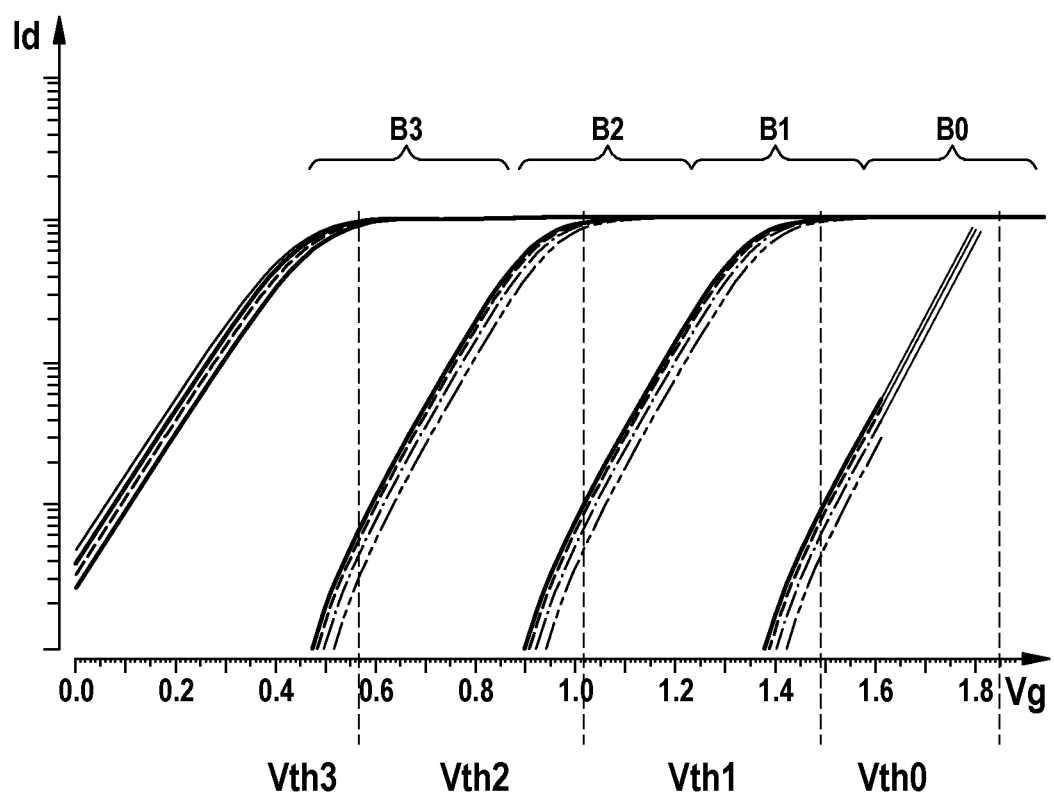
FIG. 18 schematically shows currents according to further exemplary embodiments plotted against a gate-source voltage of the present invention.

FIG. 18 schematically shows a simulation result of drain currents through FeFETs programmed with different threshold voltages Vth0, Vth1, Vth2, Vth3, according to further exemplary embodiments and plotted against a gate-source voltage Vg. By way of example, the FeFETs are thus programmable to a total of four different states, wherein more or fewer than the four states considered by way of example are also possible in further exemplary embodiments. The four different states or the corresponding threshold voltages, for example, each characterize different values of the second input variable 110-1-E2, 110-2-E2, . . . . In the region B0 according to FIG. 18, simulated drain currents of an FeFET are shown, which is programmed with the first threshold voltage Vth0 (for example, corresponding to a state "0" or value of the second input variable of zero), in the region B1 simulated drain currents of an FeFET are shown, which is programmed with the second threshold voltage Vth1 (for example, corresponding to a state "1" or value of the second input variable of "1"), in the region B2 simulated drain currents of an FeFET are shown (for example, corresponding to a state "2" or value of the second input variable of "2"), in the region B3 simulated drain currents of an FeFET are shown (for example, corresponding to a state "3" or value of the second input variable of "3").

From FIG. 18 it can be seen that, as a function of the drive signal used for the application 200 (FIG. 1), and on the basis of the programmed state of the first FeFET 110-1, the first FeFET 110-1 is activated for a certain time, e.g., in the measurement period (t0, t3), see FIG. 14; in other words, its drain-to-source path is switched to a low impedance, whereby the first FeFET 110-1 for this certain time introduces into the first circuit node N-1 a corresponding current contribution in the form of the first current I-1 (FIG. 2), for example proportional to the first input variable 110-1-E1 characterized by the drive signal AS-1. The same applies to the further FeFETs of the processing device.

Figure 19A:
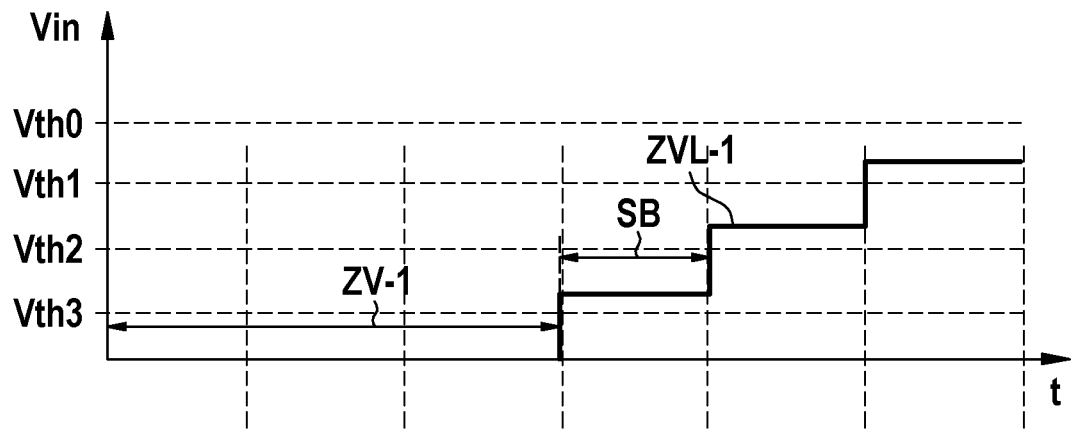
FIG. 19A schematically shows a time curve of a voltage according to further exemplary embodiments of the present invention.

FIG. 19A schematically shows a time curve ZVL-1 of a voltage Vin that can be used as a drive signal, for example first drive signal AS-1 (i.e., for example, for application to the gate electrode 110-1a (FIG. 2) of the first FeFET 110-1 according to further exemplary embodiments. The drive signal shown in FIG. 19A has a first step width SB-1 (in the present case, for example, a "time step" t4–t3 (see FIG. 19B) and a non-vanishing first time offset ZV-1 of, in the present case, for example three time steps t3–t0, and characterizes, for example, a value "1" for the first input variable 110-1-E1.

Figure 19B:
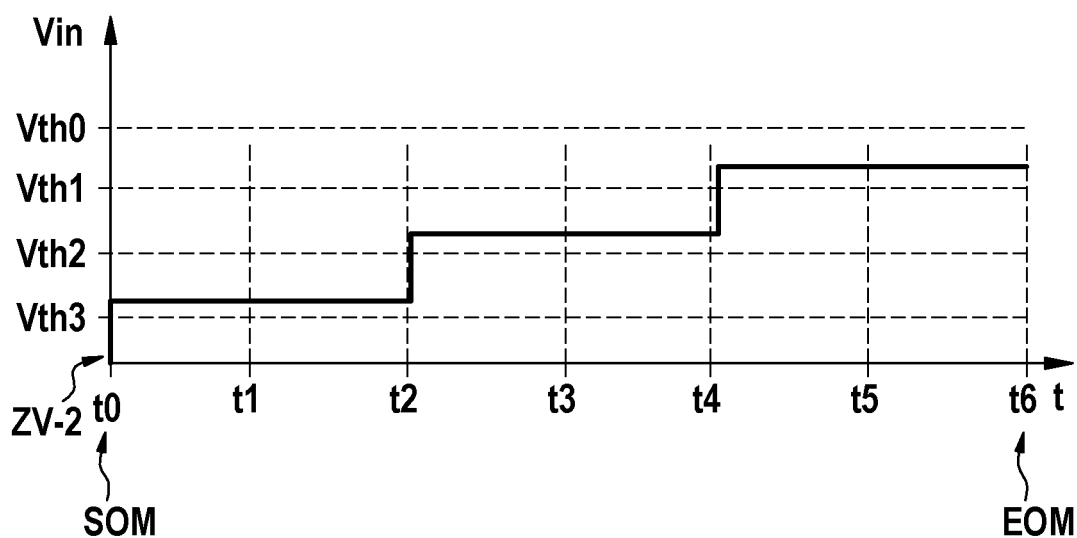
FIG. 19B schematically shows a time curve of a voltage according to further exemplary embodiments of the present invention.

FIG. 19B schematically shows a time curve ZVL-2 of a voltage Vin that can be used as a drive signal, for example first drive signal AS-1 (i.e., for example, for application to the gate electrode 110-1a (FIG. 2) of the first FeFET 110-1 according to further exemplary embodiments. The drive signal shown in FIG. 19B has a second step width SB-2 (in the present case, for example, two "time steps" t4–t2 and a vanishing second time delay ZV-2, and characterizes, for example, a value "2" for the first input variable 110-1-E1. In other words, the time curve ZVL-2 according to FIG. 19B is "stretched" over time by the factor 2 in relation to the time curve ZVL-1 from FIG. 19A, which, for example, leads to the double electrical charge being introduced into the capacitor 12 when the time curve ZVL-2 according to FIG. 19B is used, corresponding to twice the value "2" for the first input variable, compared to the time curve ZVL-1 from FIG. 19A.

Figure 20:
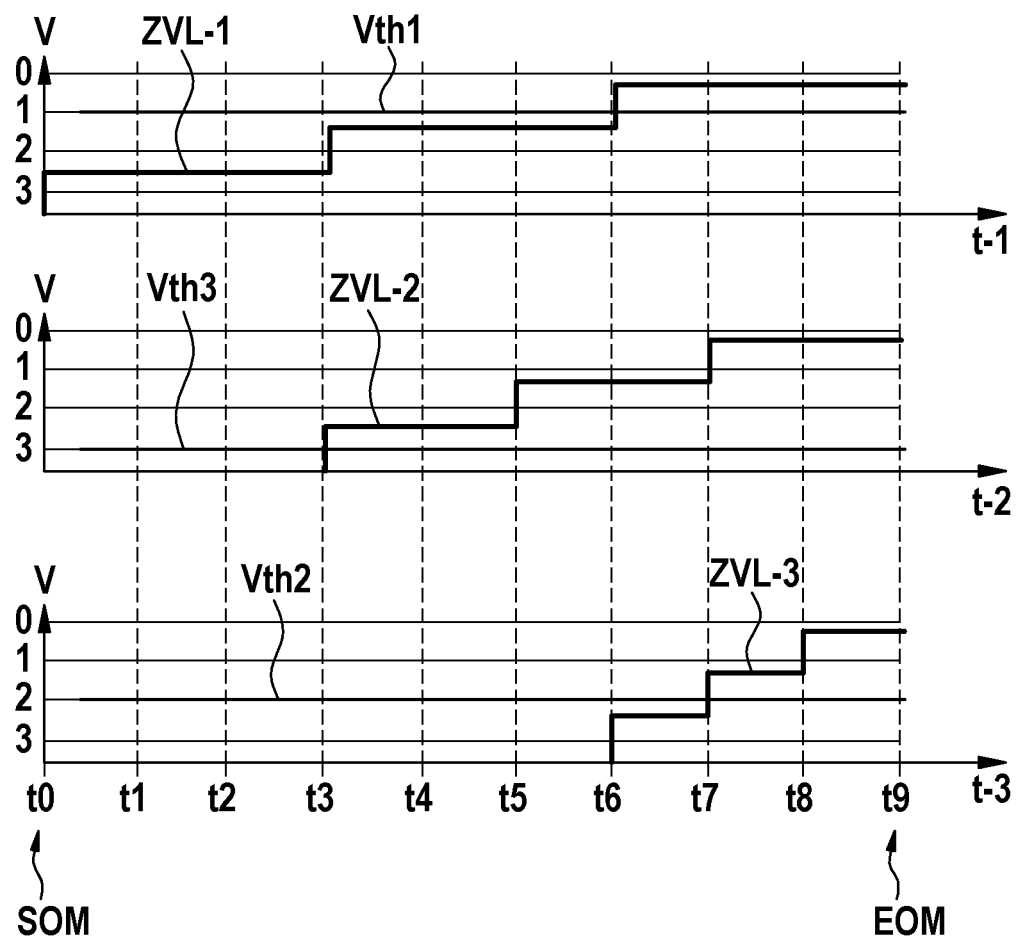
FIG. 20 schematically shows time curves of drive signals according to further exemplary embodiments of the present invention.

FIG. 20 schematically shows time curves of drive signals according to further exemplary embodiments. On a first time axis t-1 a first time curve ZVL-1 for the first drive signal AS-1 for the first FeFET 110-1, for example according to FIG. 16A or 17A, and a programmed first threshold voltage Vth1 of the first FeFET 110-1 are plotted. By way of example, the first time curve ZVL-1 corresponds to a value "3" for the first input variable 110-1-E1, and the first threshold voltage Vth1 corresponds by way of example to a value "1" for the second input variable 110-1-E2. This gives a result contribution of the first FeFET 110-1 of 3*1=3, which is characterized, for example, by the first current I-1 or the charge associated therewith applied to the capacitor 12 (FIG. 17A) during the measurement time period (t0, t9), in other words from SOM to EOM, for example.

On a second time axis t-2 according to FIG. 20 a second time curve ZVL-2 for the second drive signal AS-2 for the second FeFET 110-2, for example according to FIG. 16A or 17A, and a programmed second threshold voltage Vth3 of the second FeFET 110-2 are plotted. By way of example, the second time curve ZVL-2 corresponds to a value "2" for the first input variable 110-2-E1, and the second threshold voltage Vth3 corresponds by way of example to a value "3" for the second input variable 110-2-E2. This gives a result contribution of the second FeFET 110-2 of 2*3=6, which is characterized, for example, by the second current I-2 or the charge associated therewith applied, for example, to the capacitor 12 (FIG. 17A) during the measurement time period (t0, t9).

On a third time axis t-3 according to FIG. 20, a third time curve ZVL-3 for the third drive signal AS-3 for the third FeFET 110-3, for example according to FIG. 16A or 17A, and a programmed third threshold voltage Vth2 of the third FeFET 110-3 are plotted. By way of example, the third time curve ZVL-3 corresponds to a value "1" for the first input variable 110-3-E1, and the third threshold voltage Vth2 corresponds by way of example to a value "2" for the second input variable 110-3-E2. This leads to a result contribution of the third FeFET 110-3 of 1*2=2, which is characterized, for example, by a third current through the drain-to-source path of the third FeFET 110-3 or the charge associated therewith applied, for example, to the capacitor 12 (FIG. 17A) during the measurement time period (t0, t9).

An overall result, as can be characterized, for example, by the capacitor voltage of the capacitor 12 at the time t9, is thus, for example, 3+6+2=11, which corresponds, for example, to eleven charging cycles of the capacitor 12, for example in each case with a (limited) current of 100 nA, contributed by the FeFETs 110-1, 110-2, 110-3 on the basis of the variables shown by way of example in FIG. 20.

In the exemplary functional principle according to FIG. 20, a, for example exponential, increase in a duration of the measurement period can be given, for example for each further bit of resolution of the first input variable (a maximum of four values for the threshold voltage correspond, for example, to two bits of resolution).

It is therefore proposed in further exemplary embodiments to dynamically design a current limitation of a current through the drain-to-source path of at least one field-effect transistor, e.g., FeFETs; in other words, for example, not constant, as is the case, for example, in the case of resistors R-1, R-2, R-3 according to FIG. 16A.

Figure 21:
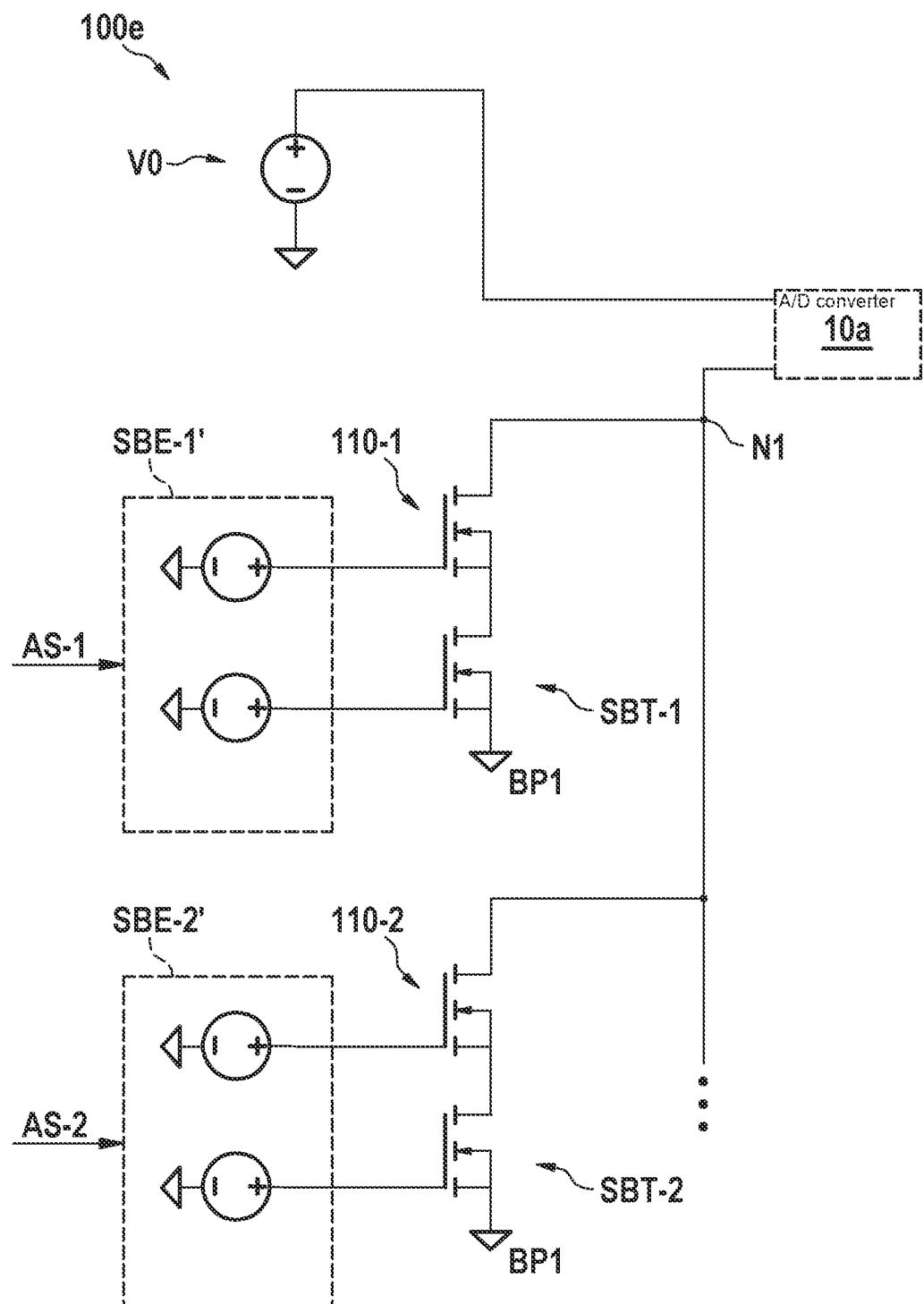
FIG. 21 schematically shows a simplified circuit diagram according to further exemplary embodiments of the present invention.
Figure 22:
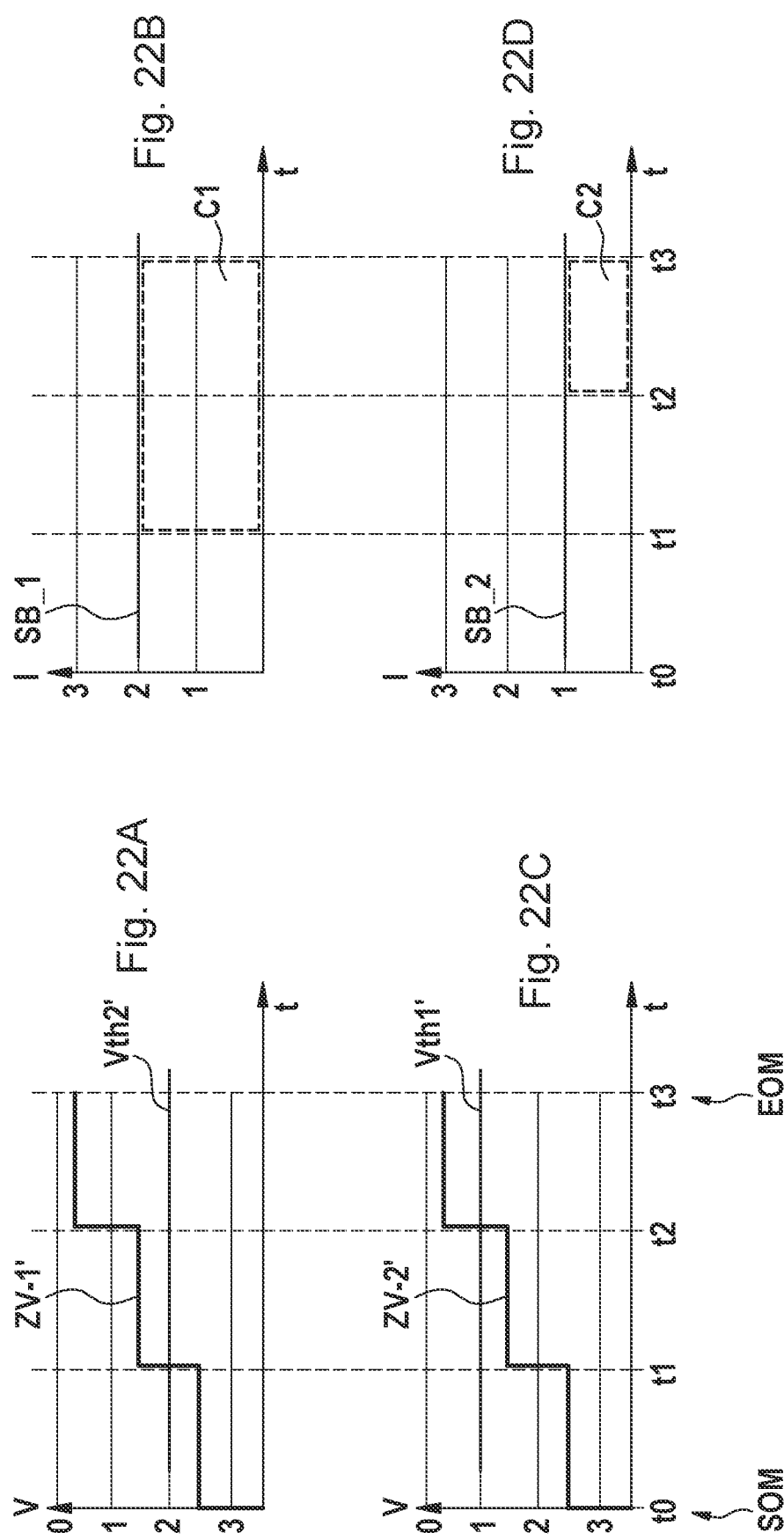
FIG. 22A schematically shows time curves of variables associated with the circuit diagram according to FIG. 21 according to further exemplary embodiments of the present invention.
FIG. 22B schematically shows a time curve of a variable associated with the circuit diagram according to FIG. 21 according to further exemplary embodiments of the present invention.
FIG. 22C schematically shows time curves of variables associated with the circuit diagram according to FIG. 21 according to further exemplary embodiments of the present invention.
FIG. 22D schematically shows a time curve of a variable associated with the circuit diagram according to FIG. 21 according to further exemplary embodiments of the present invention.

FIG. 21 schematically shows a simplified circuit diagram of a processing device 100e according to further exemplary embodiments, which, by way of example, has a first FeFET 110-1 and a second FeFET 110-2. In order to limit the currents I-1, I-2 (FIG. 2) through the drain-to-source paths of the FeFETs 110-1, 110-2, two current-limiting transistors SBT-1, SBT-2 are provided in the present case, the drain-to-source path of which transistors are in each case connected in series to the corresponding drain-to-source path of the FeFETs 110-1, 110-2, for example between a respective source electrode of the FeFETs 110-1, 110-2 and the first reference potential BP1.

The first current-limiting transistor SBT-1 is controlled by the first current-limiting device SBE-1' on the basis of the first drive signal AS-1, for example in such a way that, in the case of larger input signals or values of the first input variable 110-1-E1, a current limitation to a comparatively large value is effected, for example by reducing a resistance of the drain-to-source path of the first current-limiting transistor SBT-1, whereas, for example, in the case of smaller input signals or values of the first input variable 110-1-E1, current limitation to a comparatively small value is effected, for example by increasing the resistance of the drain-to-source path of the first current limiting transistor SBT-1. By way of example, the first current-limiting device SBE-1' is further designed to apply the first drive signal AS-1 (or a signal not shown on the basis of the first drive signal AS-1) to the gate electrode of the first FeFET 110-1. In the present case, the above-described functionality of the first current-limiting device SBE-1' is symbolized, for example, by two voltage sources (not shown in more detail), wherein other circuit variants understood by the person skilled in the art are also suitable in further exemplary embodiments.

The second current-limiting transistor SBT-2 is driven by the second current-limiting device SBE-2' in a form comparable to the first current-limiting device SBE-1'. By way of example, the second current-limiting device SBE-2' can have a function comparable to the first current-limiting device SBE-1' (for example also with respect to the application of the second drive signal AS-2).

With the configuration 100e shown above by way of example, in further exemplary embodiments it can be achieved, for example, that the measurement period m has many time steps, wherein m corresponds to a number of possible states, i.e., programmed threshold voltages, of an FeFET.

FIG. 22A, 22B, 22C, 22D each schematically show time curves of variables associated with the configuration 100e according to FIG. 21 according to further exemplary embodiments. The elements ZV-1', ZV-2' symbolize time curves of the drive signals AS-1, AS-2 according to FIG. 21, the elements Vth2', Vth1' symbolize programmed threshold voltages of the FeFETs 110-1, 110-2 according to FIG. 21. Element SB 1 from FIG. 22B symbolizes a current limitation for the first FeFET 110-1 on the basis of the first drive signal AS-1, and element SB_2 from FIG. 22D symbolizes a current limitation for the second FeFET 110-2 on the basis of the second drive signal AS-2. The area C1 in FIG. 22B symbolizes a charge which is supplied to the capacitor 12 by the first FeFET 110-1, and the area C2 in FIG. 22D symbolizes a charge which is supplied to the capacitor 12 by the second FeFET 110-2.

Figure 23:
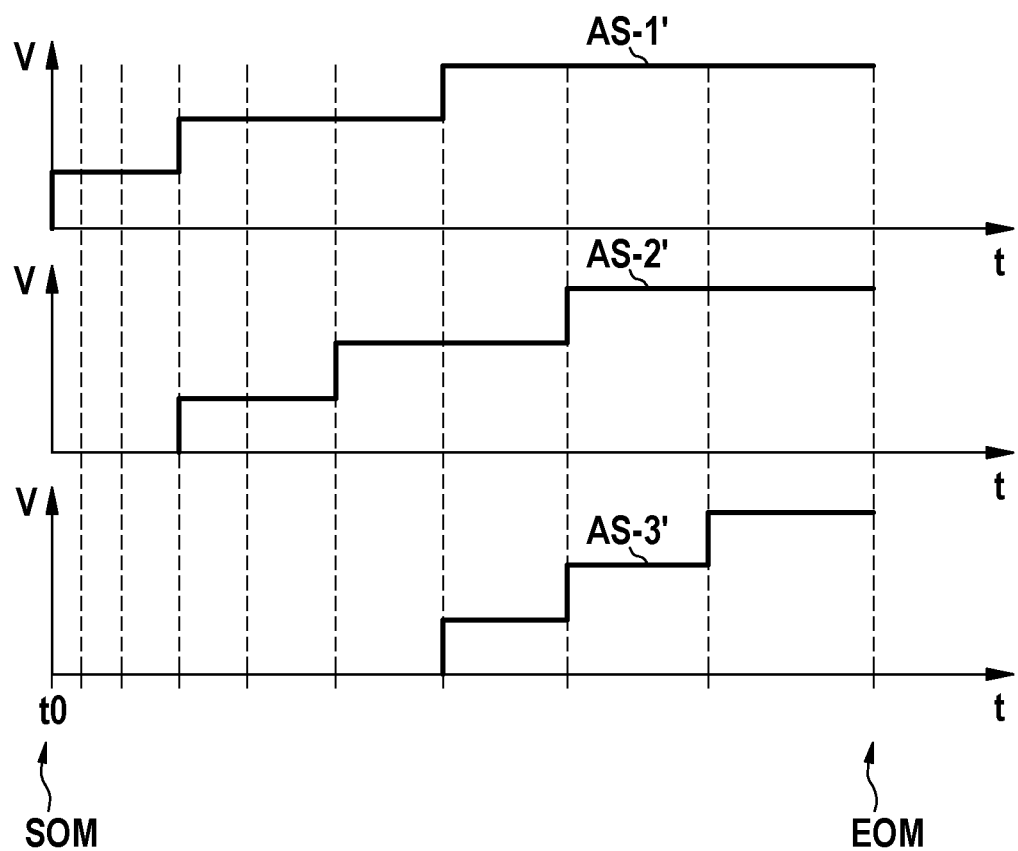
FIG. 23 schematically shows time curves according to further exemplary embodiments of the present invention.

FIG. 23 schematically shows time curves according to further exemplary embodiments, in which, by way of example, different step widths that change logarithmically in time are used for the stepped form of control signals. The drive signal AS-1' corresponds, for example, to a first value for the first input variable 110-1-E1, the drive signal AS-2' corresponds, for example, to a second value for the first input variable 110-1-E1, the drive signal AS-3' corresponds, for example, to a third value for the first input variable 110-1-E1.

Figure 24:
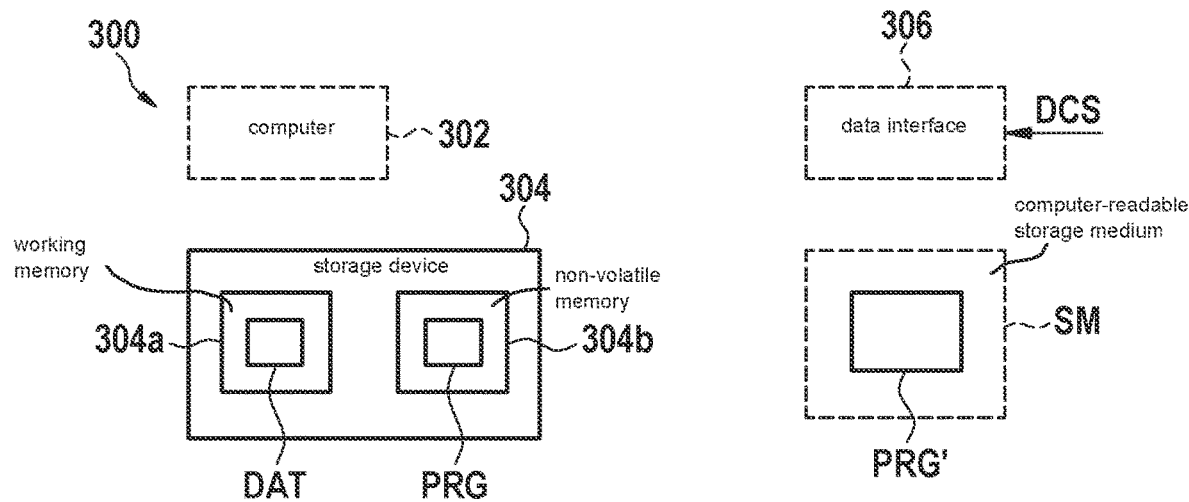
FIG. 24 schematically shows a simplified block diagram according to further exemplary embodiments of the present invention.

FIG. 24 shows by way of example a configuration of the control device 300 according to further exemplary embodiments.

By way of example, the control device 300 comprises: a computing device ("computer") 302 comprising at least one computing core (not shown), a storage device 304 associated with the computing device 302 for at least periodically storing at least one of the following elements: a) data DAT (e.g., data associated with at least one component of the device 1000 or of the processing device 100, e.g., possible values for the first input variable 110-1-E1, . . . and/or possible values for the second input variable 110-1-E2, . . . and/or possible values for the current configuration (e.g., characterizing how the FeFETs 110-1, 110-2, . . . are currently programmed (threshold voltage), and/or which values are provided for the drive signals AS-1, AS-2, . . . )); b) computer program PRG, for example, for carrying out the method according to the embodiments.

In further exemplary embodiments, the storage device 304 comprises a volatile memory (for example, working memory (RAM)) 304a, and/or a non-volatile (NVM) memory (for example, flash EEPROM) 304b, or a combination thereof or with other types of memory not explicitly mentioned.

Alternatively, the control device 300 can also be designed, for example, as an ASIC (application-specific integrated circuit) and/or as a programmable logic circuit, for example FPGA and/or as a microcontroller and/or as a digital signal processor and/or as an accelerator circuit, for example for matrix calculation operations, and/or as, for example, a pure hardware circuit, for example a digital circuit, and/or comprise at least one of these elements.

Further exemplary embodiments, FIG. 24, relate to a computer-readable storage medium SM comprising commands PRG which, when carried out by a computer 302, cause the latter to execute the method according to the embodiments.

Further preferred embodiments relate to a computer program PRG comprising commands which, when the program PRG is executed by a computer 302, cause the latter to execute the method according to the embodiments.

Further exemplary embodiments relate to a data carrier signal DCS that characterizes and/or transmits the computer program PRG according to the embodiments. For example, the data carrier signal DCS can be received, for example, via an optional data interface 306 of the control device 300.

Further exemplary embodiments, FIG. 2, relate to a computing device, for example a vector-matrix multiplication device VMM, comprising at least one device 1000 according to the embodiments.

Figure 25:
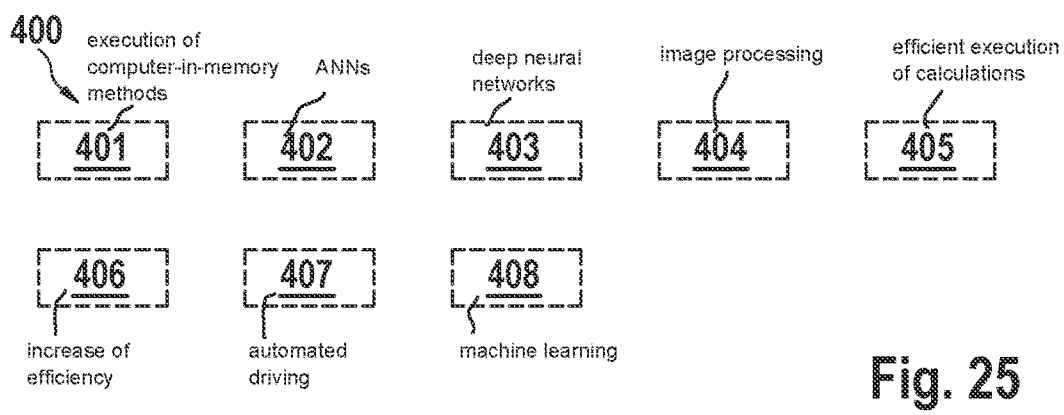
FIG. 25 schematically shows aspects of uses according to further exemplary embodiments of the present invention.

Further exemplary embodiments, FIG. 25, relate to a use 400 of the method according to the embodiments and/or of the device 1000 according to the embodiments and/or of the computing device VMM according to the embodiments for at least one of the following elements: a) execution 401 of computer-in-memory methods, for example with weights and/or input variables 110-1-E1, 110-2-E1, which can, for example, each have a plurality of bits; b) artificial neural networks 402, for example artificial deep neural networks 403; c) image processing 404; d) efficient execution 405 of calculations; e) increase 406 of an efficiency for the execution of calculations; f) automated driving 407; g) machine learning 408, for example inference.

INFORMATION ON FUNDING AND SUPPORT

The project that has led to this application was funded by the joint venture ECSEL (JU) within the framework of funding agreement no. 826655. The JU is supported by the Horizon 2020 research and innovation program of the European Union and of Belgium, France, Germany, the Netherlands and Switzerland.

The invention claimed is:
1. A method for processing input variables using a processing device which includes at least two field-effect transistors, wherein drain-to-source paths of the at least two field-effect transistors are each connected to a first circuit node, the method comprising the following steps:
applying to a gate electrode of the first field-effect transistor a first drive signal which characterizes a first input variable associated with the first field-effect transistor; and applying to a gate electrode of the second field-effect transistor a second drive signal which characterizes a first input variable associated with the second field-effect transistor a second drive signal;

wherein at least one of the first drive signal and/or the second drive signal has a non-constant amplitude at least periodically.

2. The method according to claim 1, further comprising:
ascertaining an output variable based on a first variable characterizing a time curve of a summation current associated with the first circuit node, wherein the output variable characterizes a sum that has been formed based at least on the first drive signal and the second drive signal.

3. The method according to claim 2, wherein the ascertaining of the output variable includes at least one of the following elements:
a) converting the summation current into a first digital variable using a current-based analog/digital converter;
b) converting the summation current into a first voltage by charging a capacitor using the summation current, and converting the first voltage into a second digital variable using a voltage-based analog/digital converter.

4. The method according to claim 2, further comprising:
starting an application of the first drive signal to the gate electrode of the first field-effect transistor and an application of the second drive signal to the gate electrode of the second field-effect transistor at a reference time; and
ascertaining the output variable after a prespecifiable period of time.

5. The method according to claim 1, further comprising at least one of the following elements:
a) providing the first field-effect transistor with a first threshold voltage which characterizes a second input variable associated with the first field-effect transistor;
b) providing the second field-effect transistor with a second threshold voltage which characterizes a second input variable associated with the second field-effect transistor;
c) programming or reprogramming the first threshold voltage of the first field-effect transistor;
d) programming or reprogramming the second threshold voltage of the second field-effect transistor.

6. The method according to claim 1, wherein at least one of the first and second field-effect transistors has a corresponding current-limiting function for limiting a current through its drain-to-source path, wherein the current-limiting function is implemented by at least one of the following elements: a) a setting of a gate voltage such that a maximum prespecifiable current through the drain-to-source path is not exceeded; b) a current-limiting element, including a resistor, or a transistor configured as a resistor.

7. The method according to claim 1, wherein at least one of the first drive signal and/or of the second drive signal has at least one of the following time curves at least periodically:
a) a rising stepped form, wherein the stepped form can be characterized by at least one of the following elements: a1) step width, a2) step height, a3) time offset in relation to a reference time; and
b) monotonically rising.

8. The method according to claim 7, further comprising:
specifying a first step width for the stepped form of the first drive signal; and
specifying a second step width for the stepped form of the second drive signal;

wherein, the specifying of the first step width includes specifying the first step width based on the first input variable associated with the first field-effect transistor; and
wherein, the specifying of the second step width includes includes specifying the second step width based on the first input variable associated with the second field-effect transistor.

9. The method according to claim 7, further comprising:
specifying a first slope for a rising time curve of the first drive signal; and
specifying a second slope for a rising time curve of the second drive signal;
wherein the specifying of the first slope includes specifying the first slope based on the first input variable associated with the first field-effect transistor, and
wherein the specifying of the second slope includes specifying the second slope based on the first input variable associated with the second field-effect transistor.

10. The method according to claim 7, further comprising:
specifying a first logarithmic step width for the stepped form of the first drive signal, the first logarithmic step increasing logarithmically over time; and
specifying an increasing, second logarithmic step width for the stepped form of the second drive signal, the second logarithmic step increasing logarithmically over time;
wherein the specifying of the first logarithmic step width includes specifying the first logarithmic step width based on the first input variable associated with the first field-effect transistor; and
wherein the specifying of the second logarithmic step width includes specifying the second logarithmic step width based on the first input variable associated with the second field-effect transistor.

11. The method according to claim 1, further comprising at least one of the following elements:
a) specifying a first time offset with respect to a reference time, for applying the first drive signal to the gate electrode of the first field-effect transistor, wherein the specifying of the first time delay includes specifying the first time delay based on the first input variable associated with the first field-effect transistor;
b) specifying a second time offset in relation to the reference time for applying the second drive signal to the gate electrode of the second field-effect transistor, wherein the specifying of the second time offset includes specifying the second time offset based on the first input variable associated with the second field-effect transistor.

12. The method according to claim 1, further comprising:
specifying a first amplitude value for at least one of the first drive signal and/or of the second drive signal when the first input variable associated with the corresponding first and/or second field-effect transistor has a value less than a prespecifiable minimum value, wherein the first amplitude value is a prespecifiable amount, lower than a threshold voltage, of the first and/or second field-effect transistor.

13. The method according to claim 1, further comprising at least one of the following elements:
a) at least periodically limiting a first current through the drain-to-source path of the first field-effect transistor using a first current-limiting element including a resistor or a transistor configured as a resistor, wherein the limiting the first current through the drain-to-source path of the first field-effect transistor includes limiting the first current based on the first input variable associated with the first field-effect transistor;
b) at least periodically limiting a second current through the drain-to-source path of the second field-effect transistor using a second current-limiting element including a resistor or a transistor configured as a resistor, wherein the limiting of the second current through the drain-to-source path of the second field-effect transistor includes limiting the second current based on the first input variable associated with the second field-effect transistor.

14. The method according to claim 1, wherein the processing device includes more field-effect transistors than the at least two field-effect transistors.

15. The method according to claim 1, wherein the method is used for at least one of the following elements:
a) execution of a compute-in-memory method with weights and/or input variables which each has a plurality of bits;
b) artificial neural networks;
c) image processing;
d) efficient execution of a calculation;
e) increase of an efficiency for execution of a calculation;
f) automated driving;
g) machine learning.

16. A device configured to process input variables using a processing device which includes at least two field-effect transistors, wherein drain-to-source paths of the at least two field-effect transistors are each connected to a first circuit node, the device configured to:
apply to a gate electrode of the first field-effect transistor a first drive signal which characterizes a first input variable associated with the first field-effect transistor; and
apply to a gate electrode of the second field-effect transistor a second drive signal which characterizes a first input variable associated with the second field-effect transistor a second drive signal;
wherein at least one of the first drive signal and/or the second drive signal has a non-constant amplitude at least periodically.

17. The device according to claim 16, wherein the device comprises a processing device including the at least two field-effect transistors, wherein the at least two field-effect transistors are ferroelectric field-effect transistors.

18. The device according to claim 17, further comprising at least one current-based analog/digital converter and/or at least one voltage-based analog/digital converter.

19. The device according to claim 16, wherein the device is further configured to:
ascertain an output variable based on a first variable characterizing a time curve of a summation current associated with the first circuit node, wherein the output variable characterizes a sum that has been formed based at least on the first drive signal and the second drive signal, and
wherein the device further includes at least one capacitor which can be charged at least periodically by means of the summation current.

20. The device according to claim 19, further comprising:
a discharge device configured to discharge the capacitor at least periodically.

21. The device according to claim 16,
wherein the device is further configured to ascertain an output variable based on a first variable characterizing a time curve of a summation current associated with the first circuit node, wherein the output variable characterizes a sum that has been formed based at least on the first drive signal and the second drive signal, and
wherein the device further comprises a programming device for programming or reprogramming, at least one of the following elements:
a) s first threshold voltage of the first field-effect transistor,
b) a second threshold voltage of the second field-effect transistor.

22. The device according to claim 16, further comprising at least one of the following elements:
a) a first current-limiting element including a resistor or a transistor configured as a resistor, the first current-liming element being configured to at least periodically limit a first current through the drain-to-source path of the first field-effect transistor;
b) a second current-limiting element including a resistor or a transistor configured as a resistor, the second current-limiting element being configured to at least at least periodically limit a second current through the drain-to-source path of the second field-effect transistor.

23. The device according to claim 22, wherein:
a) the first current-limiting element configured is configured to limit the first current variably over time based on the first input variable associated with the first field-effect transistor, and/or
b) the second current-limiting element is configured to limit the second current variably over time based on the first input variable associated with the second field-effect transistor.

24. The device according to claim 16, further comprising:
at least one control device configured to provide at least one of the following elements:
a) the first drive signal;
b) the second drive signal,
wherein the control device is configured to:
c1) apply the first drive signal at least periodically to the gate electrode of the first field-effect transistor; and/or
c2) apply the second drive signal at least periodically to the gate electrode of the second field-effect transistor.

25. The device according to claim 16, further comprising:
a control device configured to execute at least one of the following elements:
a) control of at least one component of the device;
b) apply to the gate electrode of the first field-effect transistor the first drive signal, and apply to the gate electrode of the second field-effect transistor the second drive signal.

26. A a vector-matrix multiplication device, comprising:
a device configured to process input variables using a processing device which includes at least two field-effect transistors, wherein drain-to-source paths of the at least two field-effect transistors are each connected to a first circuit node, the device configured to:
apply to a gate electrode of the first field-effect transistor a first drive signal which characterizes a first input variable associated with the first field-effect transistor; and
apply to a gate electrode of the second field-effect transistor a second drive signal which characterizes a first input variable associated with the second field-effect transistor a second drive signal;

wherein at least one of the first drive signal and/or the second drive signal has a non-constant amplitude at least periodically.

* * * * *